(12) United States Patent
Takahashi et al.

(10) Patent No.: US 7,628,549 B2
(45) Date of Patent: Dec. 8, 2009

(54) OPTICAL CONNECTOR

(75) Inventors: Shigeo Takahashi, Sakura (JP); Kazuhiro Takizawa, Sakura (JP); Khee Yen Serin Tan, Sakura (JP)

(73) Assignee: Fujikura Ltd., Tokyo (JP)

( * ) Notice: Subject to any disclaimer, the term of this patent is extended or adjusted under 35 U.S.C. 154(b) by 22 days.

(21) Appl. No.: 12/019,005

(22) Filed: Jan. 24, 2008

(65) Prior Publication Data
US 2009/0148109 A1 Jun. 11, 2009

(30) Foreign Application Priority Data

| | | | |
|---|---|---|---|
| Jan. 25, 2007 | (JP) | | 2007-014931 |
| Mar. 30, 2007 | (JP) | | 2007-095448 |
| Mar. 30, 2007 | (JP) | | 2007-095449 |

(51) Int. Cl.
*G02B 6/255* (2006.01)
(52) U.S. Cl. .......................... 385/98; 385/86
(58) Field of Classification Search .................. 385/78, 385/86, 95–99
See application file for complete search history.

(56) References Cited

U.S. PATENT DOCUMENTS 5,469,522 A * 11/1995 Fan .............................. 385/98
7,452,138 B2 * 11/2008 Saito et al. .................... 385/86

FOREIGN PATENT DOCUMENTS

JP 2005-345753 A 12/2005

* cited by examiner

*Primary Examiner*—Daniel Petkovsek
(74) *Attorney, Agent, or Firm*—Sughrue Mion, PLLC

(57) ABSTRACT

An optical connector for splicing a rear end of a pre-assembled optical fiber that is mounted within an optical ferrule with a tip of a second optical fiber is provided. The optical connector includes a connector body and an anchor mechanism for anchoring the second optical fiber to the connector body. The anchor mechanism includes a holder for holding the second optical fiber, and connecting portion which anchors the holder to the connector body. The length of the second optical fiber from the holder to the tip is longer than the distance from the holder to the rear end of the pre-assembled optical fiber. The rear end of the pre-assembled optical fiber is a curved convex end surface or an end with a diameter-reducing portion, and is PC-connectable to the tip of the second optical fiber.

19 Claims, 25 Drawing Sheets

OPTICAL CONNECTOR

BACKGROUND OF THE INVENTION

1. Field of the Invention

The present invention relates to a field-installable optical connector, and more particularly, to an optical connector with a pre-assembled optical fiber stub.

This Application claims priority of Japanese Patent Application No. 2007-14931, filed on Jan. 25, 2007, No. 2007-95448, filed on Mar. 30, 2007, and No. 2007-95449, filed on Mar. 30, 2007, the disclosures of which are incorporated herein by reference in its entirety.

2. Background Art

An exemplary optical connector that can be installed in an optical fiber tip at a connection site includes a pre-assembled optical fiber stub fixed in a ferrule.

In the optical connector, an optical fiber end to be terminated is spliced with a pre-assembled optical fiber end within a splicing mechanism provided to a rear end of the ferrule.

Japanese Patent Application Laid-Open No. 2005-345753 discloses an optical connector which includes a ferrule with a pre-assembled optical fiber. In the disclosed optical connector, the pre-assembled optical fiber is spliced with a second optical fiber within a splicing member.

To prevent connection loss in such an optical connector, the second optical fiber must be pressed against the pre-assembled optical fiber with sufficient force.

In some environmental conditions such as temperatures, however, the abutting force of the second optical fiber may become impaired, which increases connection loss.

SUMMARY OF THE INVENTION

In view of the aforementioned, an object of the present invention is to provide an optical connector in which optical fibers are spliced together with sufficient abutting force under any environmental conditions.

An optical connector according to an embodiment of the invention is an optical connector for splicing the rear end of a pre-assembled optical fiber that has been previously mounted within an optical ferrule in a connector body with a tip of a second optical fiber that is to be inserted into the connector body, the optical connector including: the connector body; and an anchor mechanism for anchoring the second optical fiber to the connector body, wherein: the connector body includes the optical ferrule and a connecting mechanism provided at a rear end side, opposite to a connecting end surface of the optical ferrule. The connecting mechanism includes an optical fiber alignment hole in which the pre-assembled optical fiber extending from the rear end side of the optical ferrule is inserted, the rear end of the pre-assembled optical fiber and a front end of the second optical fiber being aligned and spliced with each other in the optical fiber alignment hole; the anchor mechanism includes a holder for holding the second optical fiber, and a connecting portion which anchors the holder to the connector body; at a position where the holder is anchored to the connector body and the rear end of the pre-assembled optical fiber and the second optical fiber are aligned and spliced with each other, the length of the second optical fiber from the holder to the tip is longer than the distance from the holder to the rear end of the pre-assembled optical fiber. The rear end of the pre-assembled optical fiber has a curved convex end surface or an end with a diameter-reducing portion, and is PC-connectable to the tip of the second optical fiber.

In the invention, the connecting mechanism includes an outer cylinder body in which the rear end of the optical ferrule is inserted, an inner cylinder body of which rear end protrudes from the outer cylinder body, and an introducing cylinder body formed to continue from the rear end of the inner cylinder body; the inner cylinder body includes the optical fiber alignment hole; the introducing cylinder body includes a body portion provided at a rear end side of the inner cylinder body, and a connecting cylinder portion in which the rear end of the inner cylinder body is inserted; and the body portion includes a guide hole which guides the second optical fiber to the optical fiber alignment hole and accommodates a portion of the second optical fiber in which a coating is formed, and the guide hole communicates with the optical fiber alignment hole.

In the invention, the connecting mechanism includes an inner cylinder body and an introducing cylinder body; the inner cylinder body includes the optical fiber alignment hole, the introducing cylinder body includes a body portion provided at a rear end of the inner cylinder body, and an outer cylinder body which accommodates the full length of the inner cylinder body, and in which the rear end of the optical ferrule is inserted; and the body portion includes a guide hole which guides the second optical fiber to the optical fiber alignment hole and accommodates a portion of the second optical fiber in which a coating is formed, and the guide hole communicates with the optical fiber alignment hole.

In the invention, the connecting mechanism includes an outer cylinder body in which the rear end of the optical ferrule is inserted, a first inner cylinder body, and a second inner cylinder body inserted into a rear end side of the first inner cylinder body within the outer cylinder body; the first inner cylinder body includes the optical fiber alignment hole; the second inner cylinder body includes a guide hole which guides the second optical fiber to the optical fiber alignment hole and accommodates a portion of the second optical fiber in which a coating is formed, and the guide hole communicates with the optical fiber alignment hole.

In the invention, a tip surface of the second optical fiber is cleaved to be a substantially flat surface, the angle of inclination of the tip surface of the optical fiber with respect to a plane perpendicular to an optical axis is equal to or smaller than 0.9 degrees, and the abutting force of the tip surface against the pre-assembled optical fiber is equal to or smaller than 0.2 N; and an end surface of the rear end of the pre-assembled optical fiber is formed as a spherical surface, and the curvature radius thereof is 0.05 to 0.46 mm.

In the invention, the connecting portion includes: a connector body which is able to anchor the second optical fiber to the connector body with a bent portion of the second optical fiber that is bent and urged toward the pre-assembled optical fiber and which includes an opening through which the bent portion of the second optical fiber is exposed; a cover for opening and closing the opening; and a pressing member for pressing the bent portion to enhance the urging force; and the pressing member is able to press the bent portion by the cover closing the opening.

In the invention, the pressing member is formed as an elastically deformable plate so as to press the bent portion with an elastic repulsive force.

An optical connector according to another embodiment of the invention is an optical connector for splicing a rear end of a pre-assembled optical fiber that has been previously mounted within an optical ferrule in a connector body with a tip of second optical fiber, the optical connector including: the connector body having the optical ferrule; and an anchor mechanism for anchoring the second optical fiber to the connector body, wherein: the anchor mechanism includes a holder for holding the second optical fiber, and a connecting portion which anchors the holder to the connector body; the connecting portion is able to anchor the second optical fiber to the connector body in a state in which the second optical fiber is bent and urged toward the pre-assembled optical fiber; at a position where the holder is anchored to the connector body and the rear end of the pre-assembled optical fiber and the second optical fiber are aligned and spliced with each other, the length of the second optical fiber from the holder to the tip is longer than the distance from the holder to the rear end of the pre-assembled optical fiber; and the rear end of the pre-assembled optical fiber has a curved convex end surface or an end with a diameter-reducing portion, and is PC-connectable to the tip of the second optical fiber.

In the invention, a tip surface of the second optical fiber is cleaved to be a substantially flat surface, an angle of inclination of the tip surface of the optical fiber with respect to a plane perpendicular to an optical axis is equal to or smaller than 0.9 degrees, and abutting force of the tip surface against the pre-assembled optical fiber is equal to or smaller than 0.2 N. An end surface of the rear end of the pre-assembled optical fiber is formed as a spherical surface, and the curvature radius thereof is 0.05 to 0.46 mm.

An optical connector according to still another embodiment of the invention is an optical connector for splicing a rear end of a pre-assembled optical fiber that has been previously mounted within an optical ferrule in a connector body with a tip of second optical fiber that is to be inserted into the connector body, the optical connector including: the connector body; and an anchor mechanism for anchoring the second optical fiber to the connector body, wherein: the connector body includes the optical ferrule and a connecting mechanism provided at a rear end side, opposite to a connecting end surface of the optical ferrule; the connecting mechanism includes an optical fiber alignment hole in which the pre-assembled optical fiber extending from the rear end side of the optical ferrule is inserted, the rear end of the pre-assembled optical fiber and a front end of the second optical fiber being aligned and spliced with each other in the optical fiber alignment hole; the anchor mechanism includes a holder for holding the second optical fiber, and a connecting portion which anchors the holder to the connector body; at a position where the holder is anchored to the connector body and the rear end of the pre-assembled optical fiber and the second optical fiber are aligned and spliced with each other, the length of the second optical fiber from the holder to the tip is longer than the distance from the holder to the rear end of the pre-assembled optical fiber; thus, the connecting portion is able to anchor the second optical fiber to the connector body in a state in which the second optical fiber is bent and urged toward the pre-assembled optical fiber; the rear end of the pre-assembled optical fiber has a curved convex end surface or an end with a diameter-reducing portion, and is PC-connectable to the tip of the second optical fiber; a tip surface of the second optical fiber is cleaved to be a substantially flat surface, an angle of inclination of the tip surface of the optical fiber with respect to a plane perpendicular to an optical axis is equal to or smaller than 0.9 degrees, and abutting force of the tip surface against the pre-assembled optical fiber is equal to or smaller than 0.2 N; and an end surface of the rear end of the pre-assembled optical fiber is formed as a spherical surface, and the curvature radius thereof is 0.05 to 0.46 mm.

In the invention, the connecting mechanism includes an outer cylinder body in which the rear end of the optical ferrule is inserted, an inner cylinder body of which rear end protrudes from the outer cylinder body, and an introducing cylinder body formed to continue from the rear end of the inner cylinder body; the inner cylinder body includes the optical fiber alignment hole; the introducing cylinder body includes a body portion provided at a rear end side of the inner cylinder body, and a connecting cylinder portion in which the rear end of the inner cylinder body is inserted; and the body portion includes a guide hole which guides the second optical fiber to the optical fiber alignment hole and accommodates a portion of the second optical fiber in which a coating is formed.

In the invention, the connecting mechanism includes an inner cylinder body and an introducing cylinder body; the inner cylinder body includes the optical fiber alignment hole, the introducing cylinder body includes a body portion provided at a rear end of the inner cylinder body, and an outer cylinder body which accommodates the full length of the inner cylinder body, and in which the rear end of the optical ferrule is inserted; and the body portion includes a guide hole which guides the second optical fiber to the optical fiber alignment hole and accommodates a portion of the second optical fiber in which a coating is formed.

In the invention, the connecting mechanism includes an outer cylinder body in which the rear end of the optical ferrule is inserted, a first inner cylinder body, and a second inner cylinder body inserted into a rear end side of the first inner cylinder body within the outer cylinder body; the first inner cylinder body includes the optical fiber alignment hole; the second inner cylinder body includes a guide hole which guides the second optical fiber to the optical fiber alignment hole and accommodates a portion of the second optical fiber in which a coating is formed.

An optical connector according to further embodiment of the invention is an optical connector for splicing a rear end of a pre-assembled optical fiber that has been previously mounted within an optical ferrule in a connector body with a tip of second optical fiber that is to be inserted into the connector body, the optical connector including: the connector body; and an anchor mechanism for anchoring the second optical fiber to the connector body, wherein: the connector body includes the optical ferrule and a connecting mechanism provided at a rear end side, opposite to a connecting end surface of the optical ferrule; the connecting mechanism includes an optical fiber alignment hole in which the pre-assembled optical fiber extending from the rear end side of the optical ferrule is inserted, the rear end of the pre-assembled optical fiber and a front end of the second optical fiber being aligned and spliced with each other in the optical fiber alignment hole; the anchor mechanism includes a holder for holding the second optical fiber, and a connecting portion which anchors the holder to the connector body; the rear end of the pre-assembled optical fiber has a curved convex end surface or an end with a diameter-reducing portion; at a position where the holder is anchored to the connector body and the rear end of the pre-assembled optical fiber and the second optical fiber are aligned and spliced with each other, the second optical fiber is bent at a position where it protrudes from the holder, and the bending generates pressing force in the second optical fiber toward the rear end of the pre-assembled optical fiber, and the tip of the optical fiber and the rear end of the pre-assembled optical fiber are PC-connected.

In the invention, the connecting mechanism includes an outer cylinder body in which the rear end of the optical ferrule is inserted, an inner cylinder body of which rear end protrudes from the outer cylinder body, and an introducing cylinder body formed to continue from the rear end of the inner cylinder body; the inner cylinder body includes the optical fiber alignment hole; the introducing cylinder body includes a body portion provided at a rear end side of the inner cylinder body, and a connecting cylinder portion in which the rear end of the inner cylinder body is inserted; and the body portion includes a guide hole which guides the second optical fiber to the optical fiber alignment hole and accommodates a portion of the second optical fiber in which a coating is formed.

In the invention, the connecting mechanism includes an inner cylinder body and an introducing cylinder body; the inner cylinder body includes the optical fiber alignment hole, the introducing cylinder body includes a body portion provided at a rear end of the inner cylinder body, and an outer cylinder body which accommodates the full length of the inner cylinder body, and in which the rear end of the optical ferrule is inserted; and the body portion includes a guide hole which guides the second optical fiber to the optical fiber alignment hole and accommodates a portion of the second optical fiber in which a coating is formed.

In the invention, the connecting mechanism includes an outer cylinder body in which the rear end of the optical ferrule is inserted, a first inner cylinder body, and a second inner cylinder body inserted into a rear end side of the first inner cylinder body within the outer cylinder body; the first inner cylinder body includes the optical fiber alignment hole; the second inner cylinder body includes a guide hole which guides the second optical fiber to the optical fiber alignment hole and accommodates a portion of the second optical fiber in which a coating is formed.

In the invention, a tip surface of the second optical fiber is cleaved to be a substantially flat surface, an angle of inclination of the tip surface of the optical fiber with respect to a plane perpendicular to an optical axis is equal to or smaller than 0.9 degrees, and abutting force of the tip surface against the pre-assembled optical fiber is equal to or smaller than 0.2 N; and an end surface of the rear end of the pre-assembled optical fiber is formed as a spherical surface, and the curvature radius thereof is 0.05 to 0.46 mm.

In the invention, the connecting portion includes: a connector body which is able to anchor the second optical fiber to the connector body with a bent portion of the second optical fiber that is bent and urged toward the pre-assembled optical fiber and which includes an opening through which the bent portion of the second optical fiber is exposed; a cover for opening and closing the opening; and a pressing member for pressing the bent portion to enhance the urging force; and the pressing member is able to press the bent portion by the cover closing the opening.

According to the invention, in an optical connector in which a rear end of a pre-assembled optical fiber provided in a ferrule and a tip of the second optical fiber are spliced together, since the length of the second optical fiber from the holder to the tip is longer than the distance from the holder to the rear end of the pre-assembled optical fiber, the optical fiber can abut against the pre-assembled optical fiber with its own elasticity.

Since the abutting force keeps the connection of the optical fibers stable, connection loss can be prevented even if the optical fiber is used under hot environments for a long time.

PREFERRED EMBODIMENTS

Figure 1:
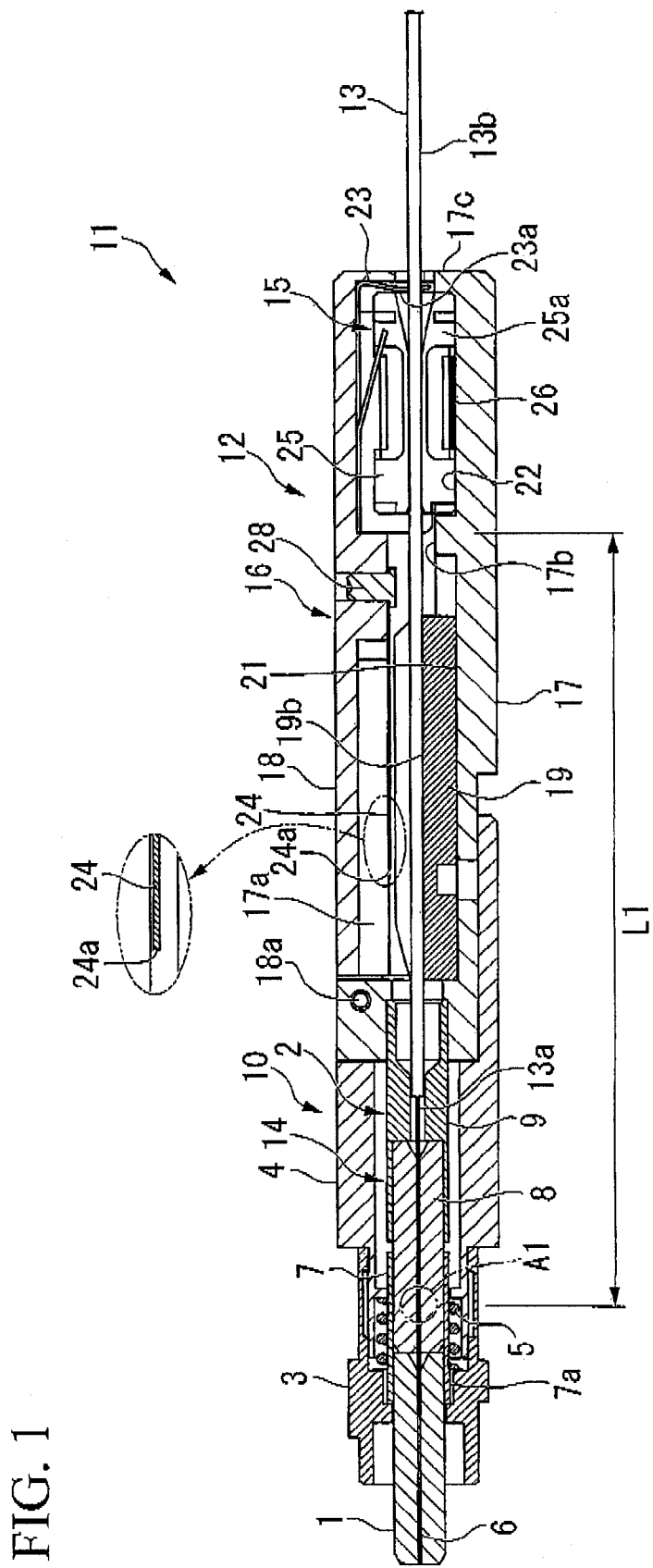
FIG. 1 is a side cross-section of an exemplary optical connector according to an embodiment of the invention.

Referring now to the drawings, a first embodiment of the invention will be described.

Figure 2:
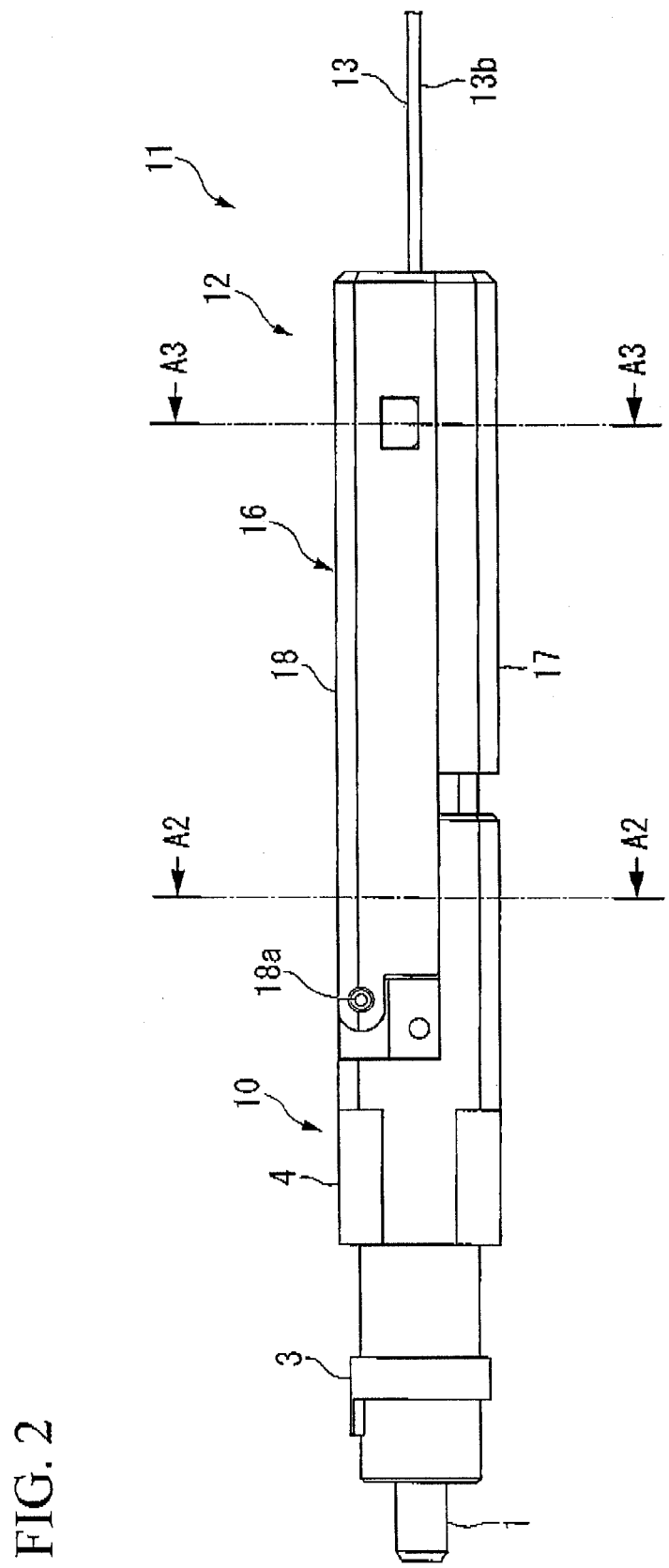
FIG. 2 is a side view of the optical connector.
Figure 3:
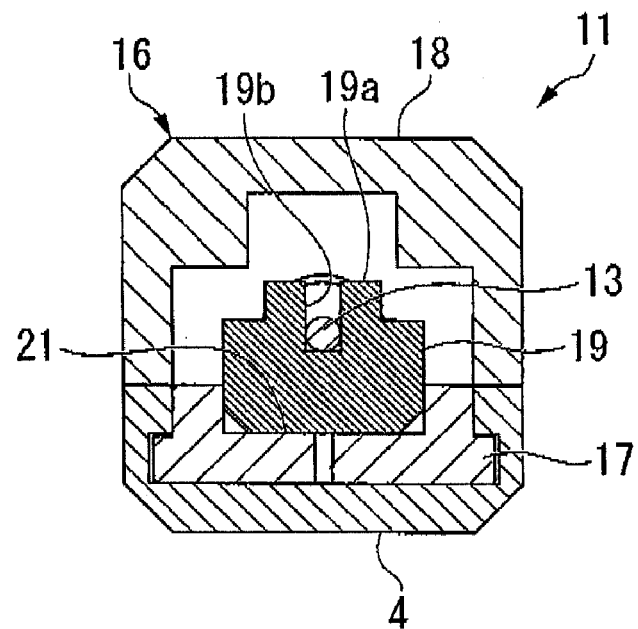
FIG. 3 is a transverse cross-section of the optical connector.
Figure 4:
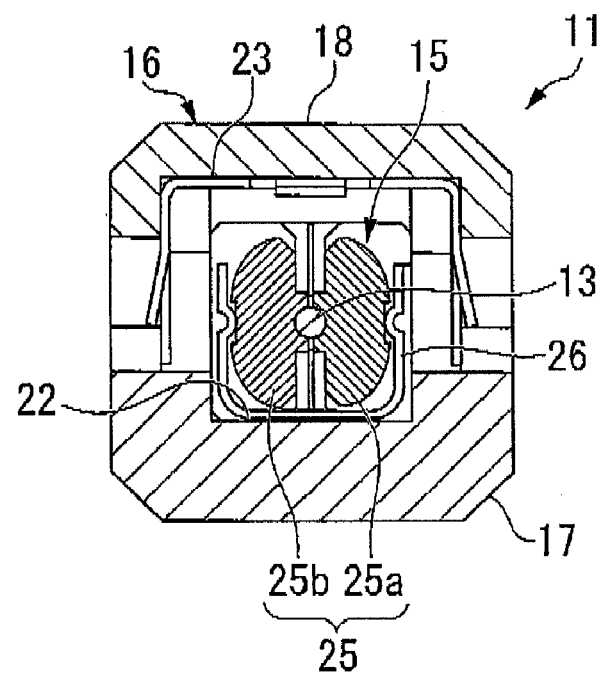
FIG. 4 is a transverse cross-section of the optical connector.
Figure 5:
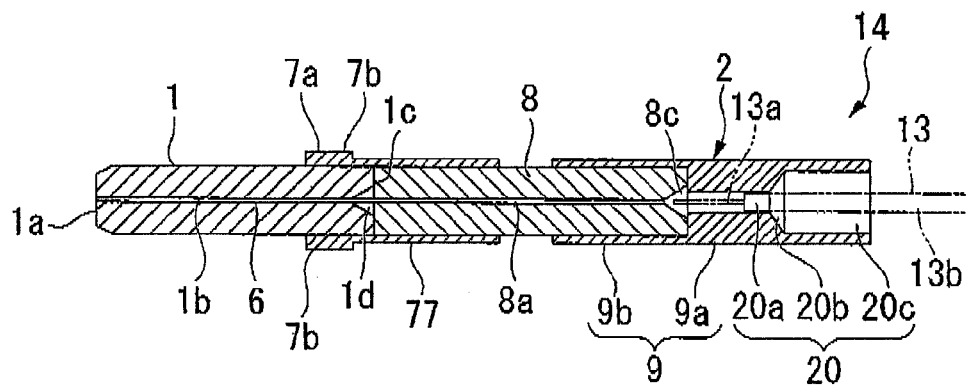
FIG. 5 is a side cross-section of a ferrule with a connecting mechanism.
Figure 6:
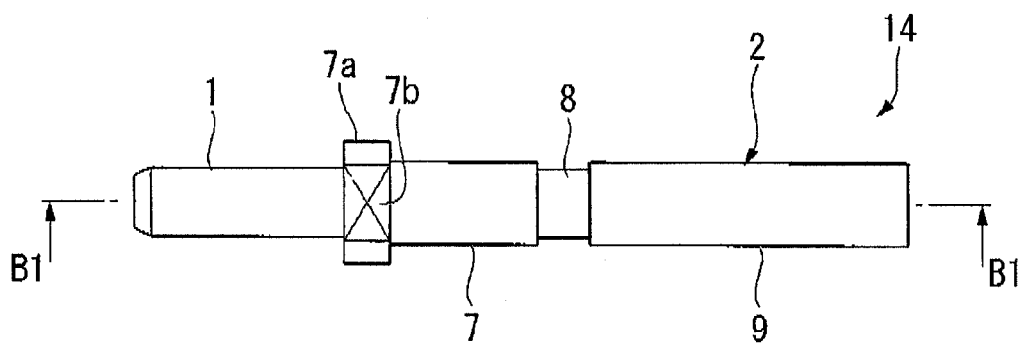
FIG. 6 is a plan view of the ferrule with a connecting mechanism.
Figure 7:
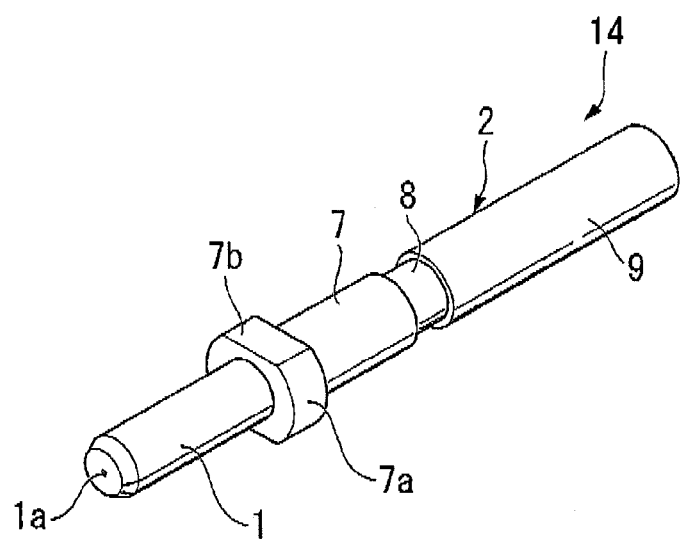
FIG. 7 is a perspective view of the ferrule with a connecting mechanism.
Figure 8:
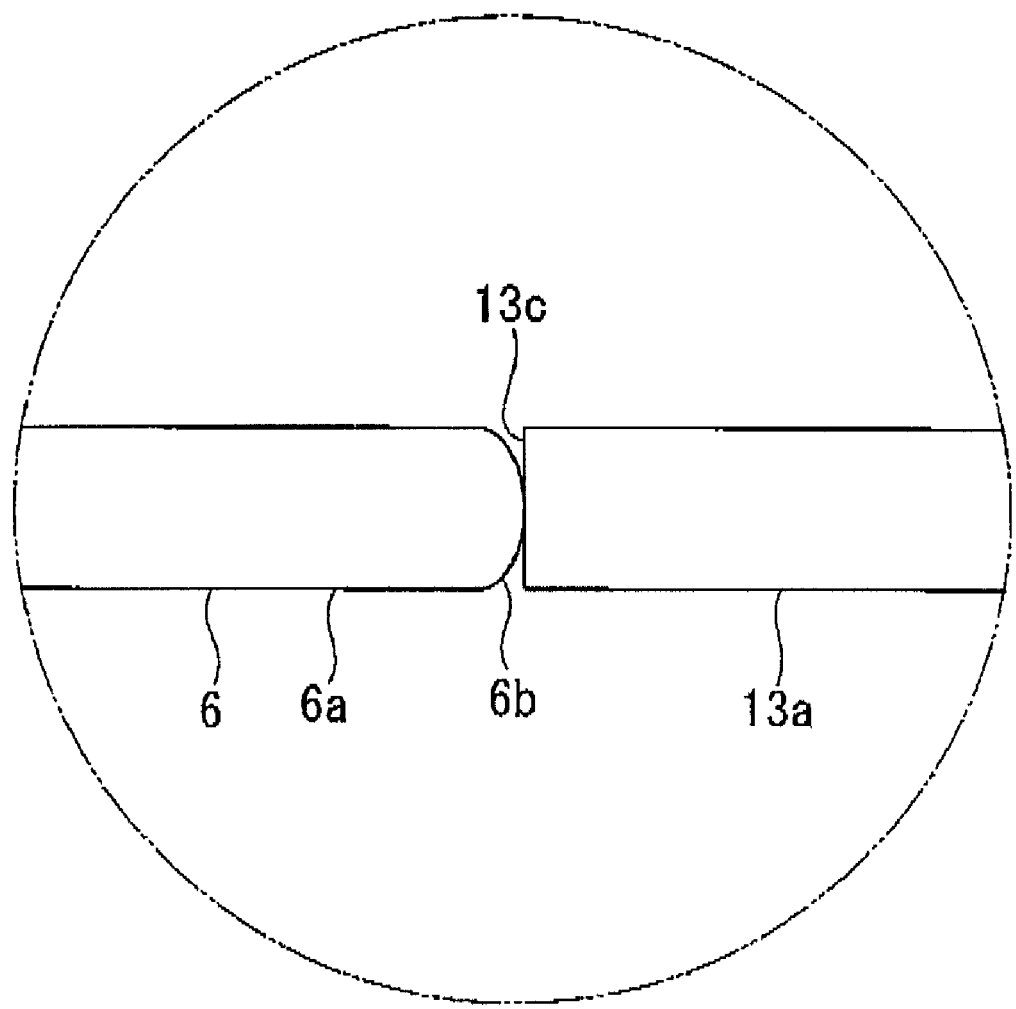
FIG. 8 is an enlarged view of an optical fiber connecting portion.
Figure 9:
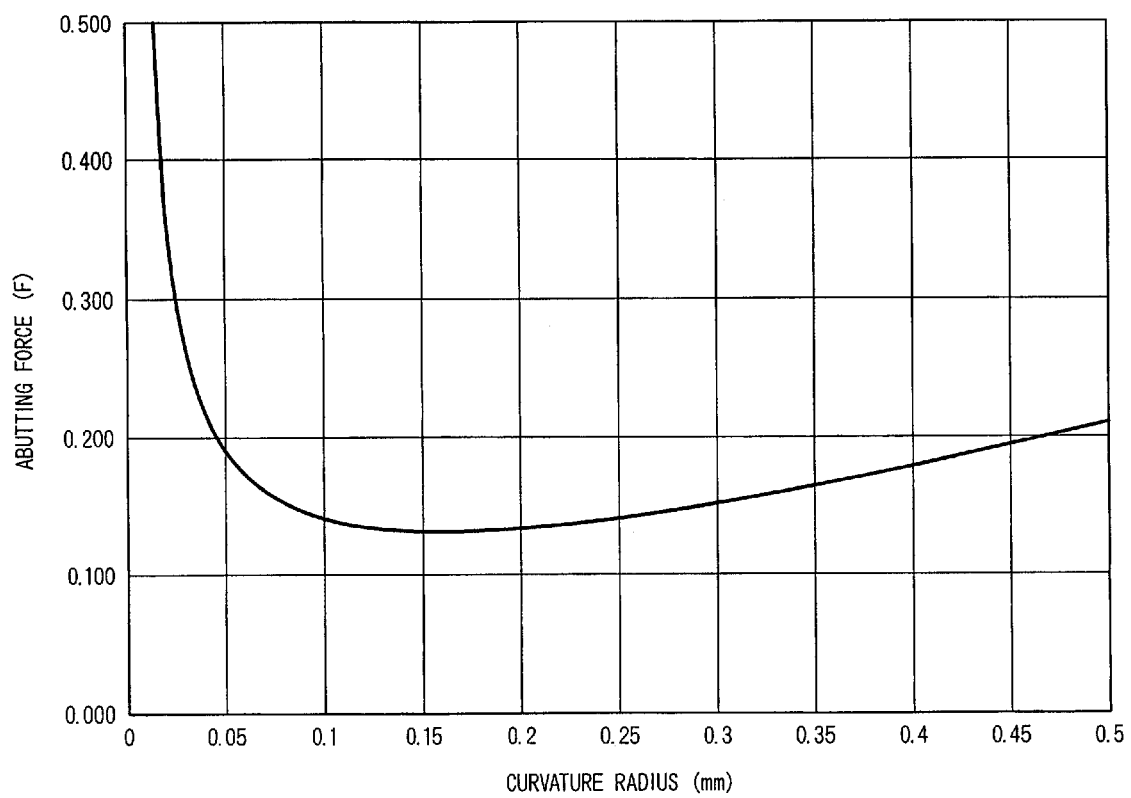
FIG. 9 is a graph showing a relationship between abutting force of the optical fiber and a curvature radius of an end surface.
Figure 10:
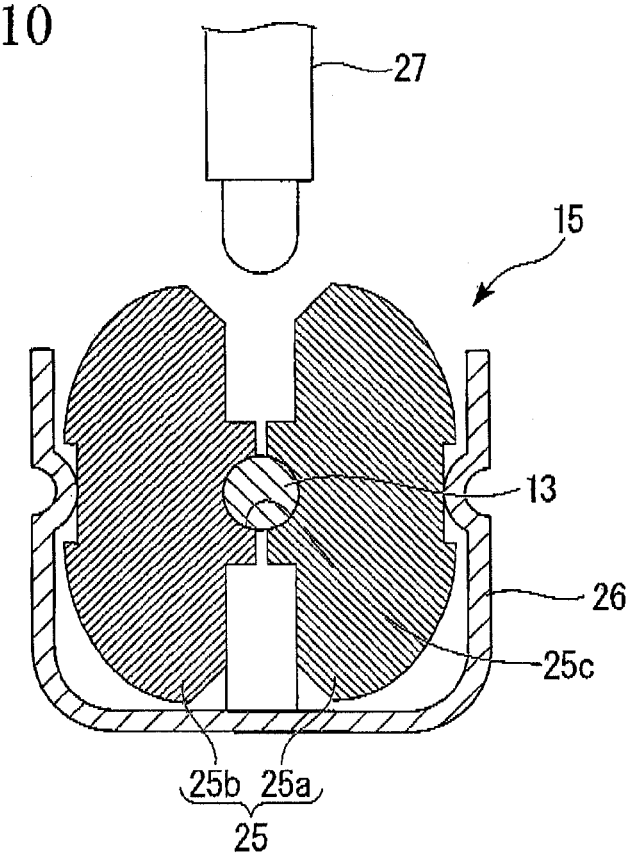
FIG. 10 is a cross-section illustrating an operation of a holder.
Figure 11:
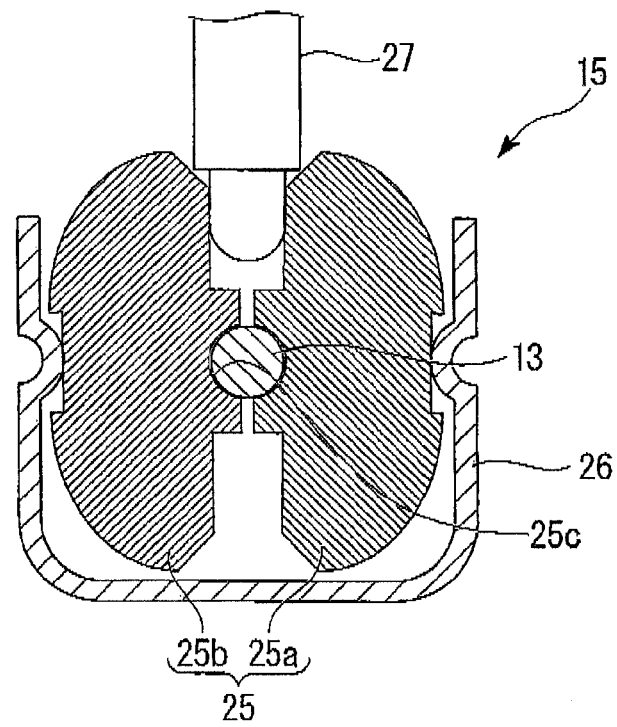
FIG. 11 is a cross-section illustrating the operation of the holder.

FIGS. 1 and 2 show an optical connector 11 according to a first embodiment of the invention. FIG. 1 is a side cross-section of the optical connector 11. FIG. 2 is a side view showing an exterior of the optical connector 11. FIG. 3 is a cross-section taken along line A2-A2 in FIG. 2. FIG. 4 is a cross-section taken along line A3-A3 in FIG. 2. FIG. 5 is a side cross-section of a ferrule 14 with a connecting mechanism included in the optical connector 11. FIG. 5 is a cross-section taken along line B1-B1 in FIG. 6. FIG. 6 is a plan view of the ferrule 14 with a connecting mechanism. FIG. 7 is a perspective view of the ferrule 14 with a connecting mechanism. FIG. 8 is an enlarged view of an optical fiber connecting portion denoted by the reference numeral A1 in FIG. 1. FIG. 9 is a graph showing a relationship between the abutting force of the optical fiber and a curvature radius of an end surface. FIGS. 10 and 11 are cross-sections illustrating an operation of a holder 15.

In the following description, the left hand in FIG. 1, i.e., the tip side of the ferrule 1 may be referred to as "forward" and right hand may be referred to as "rearward (backward)".

As shown in FIGS. 1 and 2, the optical connector 11 according to an embodiment of the invention includes a connector body 10, and an anchor mechanism 12 for anchoring an optical fiber 13 (i.e., second optical fiber) to the connector body 10.

The connector body 10 includes the ferrule 14 with a connecting mechanism, a plug frame 3 mounted at an outside of the ferrule 14 with a connecting mechanism, a stop ring 4 attached to the plug frame 3, and an urging means 5 provided within the stop ring 4.

The plug frame 3 is formed as a sleeve which accommodates an optical ferrule 1 (hereinafter, referred to as "ferrule").

The stop ring 4 is formed as a sleeve which accommodates a connecting mechanism 2, and is attached to a rear end of the plug frame 3.

The urging means 5 urges the ferrule 14 with a connecting mechanism forward by pressing a flange 7a forward using the reaction force from the stop ring 4. The urging means 5 provides the ferrule 1 with abutting force against the opposing optical connector when the optical connector 11 is spliced with the opposing optical connector. The urging means 5 may be a coil spring.

As shown in FIGS. 5 to 7, the ferrule 14 with a connecting mechanism includes the ferrule 1 and the connecting mechanism 2 disposed at the rear end of the ferrule 1.

The ferrule 1 includes an optical fiber introducing hole 1b (i.e., a micropore) formed along an axis line thereof. The pre-assembled optical fiber 6 (e.g., an optical fiber bare wire) is inserted and fixed in the optical fiber introducing hole 1b. The tip of the pre-assembled optical fiber 6 is exposed at an end surface 1a of the ferrule 1, and the rear end protrudes from the rear end of the ferrule 1 and is inserted in the connecting mechanism 2.

The ferrule 1 is made of, for example, ceramics such as zirconia, or glass. The material of the ferrule 1 may be selected depending on the environment.

Under conditions of a temperature of over 100 degrees centigrade, the ferrule 1 is preferably made of glass in view of consistency of the coefficients of linear expansion between the pre-assembled optical fiber 6 and the ferrule 1. Excessively large differences in the coefficients of linear expansion between the pre-assembled optical fiber 6 and the ferrule 1 will cause problems such as position shifts of the pre-assembled optical fiber 6 at the connecting end surface of the ferrule 1, and deterioration in durability of the ferrule 1.

An introducing portion 1d is provided at the rear end of the ferrule 1. The introducing portion 1d is formed as a tapered hole having a gradually smaller diameter toward the optical fiber introducing hole 1b from the rear end surface of the ferrule 1.

The connecting mechanism 2 is for splicing the rear end 6a of the pre-assembled optical fiber 6 and the tip 13a of the optical fiber 13. The tip 13a is an optical fiber bare wire protruding from the optical fiber 13 with a coating 13b. The optical fiber may be a plastic coated fiber and an optical fiber wire.

The connecting mechanism 2 includes an outer cylinder body 7, a first capillary 8 (inner cylinder body), and a second capillary 9 (introducing cylinder body).

The rear end 1c of the ferrule 1 is inserted through the outer cylinder body 7. The first capillary 8 is inserted in the outer cylinder body 7 from the back.

The outer cylinder body 7 is formed in a substantially cylindrical shape with a flange 7a formed at a front end thereof. A flat portion 7b is formed in an outer surface of the flange 7a.

The rear end 1c of the ferrule 1 is inserted in the outer cylinder body 7 from the front, and the first capillary 8 is inserted in the outer cylinder body 7 from the back. In the illustrated example, an inner diameter of the outer cylinder body 7 is substantially equal to an outer diameter of the ferrule 1 and the first capillary 8.

The outer cylinder body 7 may be formed to fit onto, and fixed to, the ferrule 1 with the rear end 1c of the ferrule 1 press-fitting in the outer cylinder body 7. The outer cylinder body 7 may alternatively be attached to the ferrule 1 with an adhesive.

A first capillary 8 may be made of ceramics such as zirconia, as well as glass, or synthetic resin.

The first capillary 8 is formed in a substantially cylindrical shape. In the illustrated example, the outer diameter of the first capillary 8 is substantially equal to an inner diameter of the outer cylinder body 7.

The first capillary 8 includes an optical fiber alignment hole 8a along an axis line thereof.

The optical fibers 6 and 13 can be removably inserted through the optical fiber alignment hole 8a. The optical fiber alignment hole 8a functions as an alignment mechanism for aligning the pre-assembled optical fiber 6 with a tip 13a of the optical fiber 13. The optical fibers 6 and 13 are spliced together in the optical fiber alignment hole 8a. The diameter of the optical fiber alignment hole 8a is slightly larger than that of the optical fiber bare wire, but is selected so that the core of the optical fiber 6 and the core of the optical fiber 13 correspond with each other when the optical fibers 6 and 13 are spliced together.

An inducting portion 8c may be provided at the rear end of the first capillary 8. The inducting portion 8c is a hole having a gradually smaller diameter toward the optical fiber alignment hole 8a from the rear end surface of the first capillary 8.

The second capillary 9 includes a capillary body 9a (body portion) and a connecting cylinder portion 9b extending forward from the front end of the capillary body 9a.

The capillary body 9a is formed in a substantially cylindrical shape, and includes an optical fiber inserting hole 20 along axis line thereof through which the optical fiber 13 is inserted.

The optical fiber inserting hole 20 includes a guide hole 20a, an introducing hole 20b and a standard diameter portion 20c. The guide hole 20a guides the optical fiber 13 to the optical fiber alignment hole 8a of the first capillary 8, and accommodates a portion in which the coating 13b is formed. The introducing hole 20b is formed at the rear side of the guide hole 20a. The standard diameter portion 20c is formed at the rear side of the introducing hole 20b.

The guide hole 20a guides the optical fiber 13 to the optical fiber alignment hole 8a of the first capillary 8. The guide hole 20a communicates with the optical fiber alignment hole 8a with the central axis of the guide hole 20 coinciding with the axis of the optical fiber alignment hole 8a. The guide hole 20a has an outer diameter substantially equal to or slightly larger than that of the coating 13b of the optical fiber 13. The portion of the optical fiber 13 with the coating 13b can be removably accommodated in the guide hole 20a.

The introducing hole 20b guides the optical fiber 13 to the guide hole 20a. The introducing hole 20b is formed so that the inner diameter becomes gradually smaller toward the guide hole 20a. The introducing hole 20b preferably has an inner diameter at the front end that is substantially equal to the inner diameter of the guide hole 20a.

Preferably, the inner diameter of the standard diameter portion 20c is substantially constant, and equal to the maximum diameter of the introducing hole 20b.

The connecting cylinder portion 9b is formed in a substantially cylindrical shape, in which the rear portion of the first capillary 8 can be inserted.

The capillary body 9a and the connecting cylinder portion 9b are preferably formed integrally with each other.

The second capillary 9 can be made of metal, plastic, and the like.

FIG. 8 illustrates an end surface 6b (i.e., a connecting end surface) of the rear end 6a of the pre-assembled optical fiber 6 shown in FIG. 1 denoted by the reference numeral A1. The end surface 6b shown in FIG. 8 is formed as a curved convex surface.

As shown in FIG. 8, the entire end surface 6b is preferably formed as a spherical surface. Alternatively, the end surface 6b may be formed as a non-spherical surface as long as it is formed as a convex surface having a gradually smaller diameter toward the tip so that the end surface 6b can be PC-connected to the tip 13a of the optical fiber 13. The end surface 6b may be formed as a partly curved convex surface and not only formed as an entirely curved convex surface.

Although not shown, the partly curved convex surface of the end surface 6b may be, for example, a curved surface obtained by melting only a peripheral portion of a cleaved optical fiber end portion through later-described discharging.

The end surface 6b can be formed as a convex surface when melted through, for example, arc discharging. In particular, the end surface 6b can be formed as a curved convex surface by heating through arc discharging which melts the rear end 6a of the optical fiber that has been cut with an optical fiber cutter.

The shape of the end surface 6b is varied according to the amount of heat applied to the optical fiber. A smaller amount of heat may produce an end surface 6b with a partly curved convex surface as described above. A larger amount of heat may produce an end surface 6b with an entirely curved convex surface. That is, the entire end surface 6b becomes spherical.

Excessively large amounts of heat may produce a spherical portion having a diameter larger than that of the optical fiber 6. Thus, the power and processing time of arc discharging must be controlled.

The end surface 6b may also be formed as a convex surface by PC (Physical Contact) polishing. PC polishing methods may include SPC (Super Physical Contact) polishing, AdPC (Advanced Physical Contact) polishing, and APC (Angled Physical Contact) polishing.

PC polishing is a process for polishing the end surface of the optical fiber to a curved convex shape to reduce Fresnel reflection. The polished end surface can be PC-connected. The PC polishing process may include polishing, with a polisher, a tip of the optical fiber 6 that is fixed to a fixture.

A PC-connection can be established between a curved convex end surface 6b (a core portion) of the pre-assembled optical fiber 6 and the tip surface 13a (a core portion) of the optical fiber 13 which are made to closely contact together. Thus, no index matching agent is required in this structure.

Therefore, the connecting operation becomes easier as compared with the case where an index matching agent is used. Connection loss caused by ingression of air bubbles or dust can also be prevented.

Since the characteristics of the index matching agent vary depending on temperatures, the index matching agent may elute off under hot environments and cause increased connection loss. In the invention, however, no index matching agent is used, and no connection loss occurs even under hot environments.

A spacer having an insertion hole through which the optical fiber is inserted is used for polishing the end surface of the optical fiber 6. With a spacer, polishing can be conducted while only a portion of the optical fiber to be polished is exposed (see JP-A No. 2002-59348).

The optical fibers 6 and 13 may be general-purpose quartz optical fibers, but not limited thereto.

The end surface 6b (connecting end surface) of the rear end 6a of the optical fiber 6 is most preferably formed as a spherical surface.

The curvature radius of the end surface 6b of the pre-assembled optical fiber 6 is preferably not less than 0.05 mm, and most preferably 0.05 to 0.46 mm.

The curvature radius which is not less than 0.05 mm may allow the PC-connection to be established between the end surface 6b of the pre-assembled optical fiber 6 and the core of the other optical fiber 13 even if the angle of inclination of the tip surface 13c of the optical fiber 13 is large. Thus, connection loss can be reduced. The curvature radius smaller than 0.46 mm may allow the PC-connection to be established between the end surface 6b of the pre-assembled optical fiber 6 and the core of the other optical fiber 13 even if the angle of inclination of the tip surface 13c of the optical fiber 13 is large. Thus, connection loss can be reduced.

Next, the shape of the tip surface 13c of the optical fiber 13 will be described.

Preferably, the tip surface 13c of tip 13a of the optical fiber 13 is formed substantially flat. The tip surface 13c may be angled with respect to a plane perpendicular to an optical axis of the optical fiber 13, but excessively large angles may cause severe connection loss. The inclination angle may be equal to or smaller than 0.9 degrees.

The tip surface 13c of the optical fiber 13 is formed as a cut (i.e., cleaved) surface formed by cleaving the optical fiber 13 with an optical fiber cutter. Usually, when cleaved with an optical fiber cutter, the cut surface may be inclined with respect to the plane perpendicular to the optical axis, and the angle of inclination will be up to about 0.9 degrees.

Abutting force of the optical fiber 13 to the pre-assembled optical fiber 6 is preferably smaller than 0.2 N. The abutting force which is smaller than 0.2 N may prevent deterioration in stability caused by a degraded connecting end surface. Thus, a stable connection is obtained over a long period of time. The structure for obtaining abutting force can also be simplified. In particular, the abutting force may be obtained from the elasticity of the optical fiber 13 as described later. Such a structure may include obtaining the abutting force by bending the optical fiber 13.

FIG. 9 is a graph showing a relationship between the abutting force of the optical fiber 13 with respect to the pre-assembled optical fiber 6 and the curvature radius of the end surface 6b.

FIG. 9 illustrates the influence the curvature radius of the end surface 6b of the optical fiber 6 made on the connection of the optical fibers 6 and 13, when a PC-connection of the optical fibers 6 and 13 is tried with the angle of inclination of the tip surface 13c of the optical fiber 13 being 0.9 degrees. In the area above the curve in FIG. 9, substantially no connection loss occurs and the optical fibers 6 and 13 are successfully PC-connected.

FIG. 9 shows that a PC-connection can be established when the abutting force is 0.2 N and the curvature radius of the end surface 6b is set to 0.05 to 0.46 mm.

FIG. 9 shows that the curvature radius of the end surface 6b which is set to the above range allows a PC-connection to be established even if the angle of inclination of the tip surface 13c of the optical fiber 13 is large.

As shown in FIGS. 1 to 4, an anchor mechanism 12 includes the holder 15 for holding the coating 13b of the optical fiber 13, and a connecting portion 16 for anchoring the holder 15 to the connector body 10.

As shown in FIG. 1, the connecting portion 16 includes a connector body 17, a cover 18, a pressing member 24, and a positioning member 19. The connector body 17 is a base in which the optical fiber 13 can be inserted. The cover 18 opens and closes the opening 17a provided at an upper portion of the connector body 17. The pressing member 24 presses the optical fiber 13 within the connector body 17. The positioning member 19 is provided in the connector body 17.

A first accommodating portion 21 which is a recess for accommodating the positioning member 19, and a second accommodating portion 22 which is a recess for accommodating the holder 15 are formed in the inside of the connector body 17.

The second accommodating portion 22 is formed at the rear side of the first accommodating portion 21, and is partitioned from the first accommodating portion 21 by a partitioning projection 17b. The second accommodating portion 22 is provided between the partitioning projection 17b and a rear wall portion 17c formed at the rear end of the connector body 17. The rear wall portion 17c is formed so as to prevent a backward movement of the holder 15.

As shown in FIG. 3 (cross-section taken along line A2-A2 in FIG. 2), the positioning member 19 is formed as a block. A guide groove 19b for guiding the optical fiber 13 is formed in the upper surface 19a along the front-rear direction of the connector body 17.

As shown in FIG. 1, the cover 18 is formed such that an opening 17a of the connector body 17 can be covered with.

An urging member 23 may be provided at an inner side of the cover 18. The urging member 23 is elastically deformed to abut against and urge the rear end of the holder 15 forward to position the same. The urging member 23 may be formed as a flat spring which abuts against the rear end of the holder 15 at a pressing portion 23a to urge the holder 15 forward.

The cover 18 is rotatably connected to the connector body 17 via a hinge 18a formed in a front end thereof. The cover 18 rotates about the hinge 18a to open and close an opening 17a.

In the illustrated example, a pressing member 24 is formed as an elongated plate along a longitudinal direction of the connector body.

The pressing member 24 is fixed to an underside of the cover 18 substantially in parallel with the cover 18 by a fixture 28 which is inserted in an opening (not shown) formed in an end portion (rear end).

The pressing member 24 is spaced apart from the cover 18 except for an end portion (rear end) which is fixed to the cover 18. The pressing member 24 may be elastically deformed so that a tip 24a is moved up and down. The pressing member 24 may be made of any material such as metal and resin.

Although not shown in FIG. 1, the optical fiber 13 may sometimes be bent upward. The pressing member 24 may be formed so as to press the bent portion of the optical fiber 13 with elastic repulsive force.

The rigidity of the optical fiber 13 and thus the abutting force thereof may vary in some temperature environments. Sufficient abutting force, however, can be obtained by the pressing member 24 forcibly pressing the optical fiber 13 into the guide groove 19b.

As shown in FIGS. 4 (a cross-section taken along line A3-A3 in FIG. 2), 10 and 11, the holder 15 includes an element unit 25 and a clamp spring 26 mounted on the element unit 25.

The element unit 25 consists of two elements 25a and 25b, and holds the optical fiber 13 between the elements 25a and 25b due to the elasticity of the clamp spring 26.

An introduction groove 25c for introducing the optical fiber 13 is formed in one or both of the corresponding surfaces of the elements 25a and 25b.

In the holder 15, a wedge 27 is inserted between the elements 25a and 25b to widen the space therebetween, then the optical fiber 13 may be introduced into the space. When the wedge 27 is drawn out, the optical fiber 13 is kept between the elements 25a and 25b by clamping force of the clamp spring 26.

The holder 15 is positioned with respect to the connector body 17 with the holder 15 accommodated in the second accommodating portion 22 and urged forward by the urging member 23.

That position may be referred to as a reference position of the holder 15 anchoring on the connector body 10. As shown in FIG. 1, the length of the optical fiber 13 extending from the holder 15 to the tip 13a is made longer than the distance L1 from the holder 15 to the rear end 6a of the pre-assembled optical fiber 6.

In this way, force in the direction of shortening the optical fiber 13 is applied to the optical fiber 13 between the pre-assembled optical fiber 6 and the holder 15. Then, the optical fiber 13 extends in the stretching direction due to the elasticity thereof, and abuts against the pre-assembled optical fiber 6 with sufficient force. Since the abutting force keeps the connection of the optical fibers 6 and 13 stable, even if the optical fibers are used in, for example, hot environments for a long time, occurrence of connection loss can be prevented.

The difference between the length of the optical fiber 13 extending from the holder 15 and the distance L1 is determined mainly on the specification (e.g., the diameter and the coating material) of the optical fiber and the temperature of the environment. If the difference between the length of the optical fiber 13 extending from the holder 15 and the distance L1 is not sufficiently large, the optical fiber 13 and the pre-assembled optical fiber 6 may possibly fail to be PC-connected.

Figure 12:
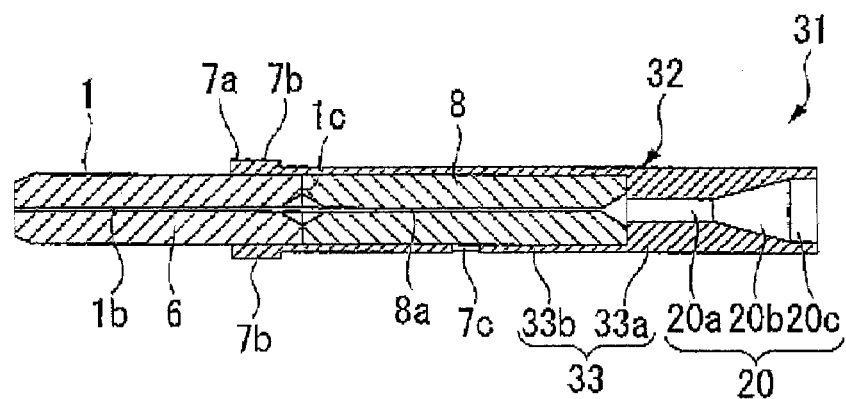
FIG. 12 is a side cross-section of the ferrule with a connecting mechanism.
Figure 13:
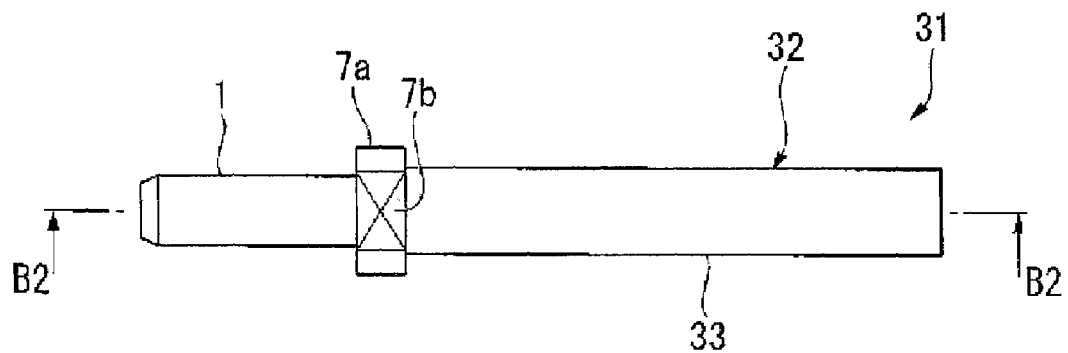
FIG. 13 is a plan view of the ferrule with a connecting mechanism.

FIGS. 12 and 13 show another exemplary ferrule with a connecting mechanism. FIG. 12 is a side cross-section of the ferrule 31 with a connecting mechanism. FIG. 12 is a cross-section taken along line B2-B2 in FIG. 13. FIG. 13 is a plan view of the ferrule 31 with a connecting mechanism. Hereinafter, identical reference numerals may be used to denote the components that have been described and the explanations thereof will be appropriately omitted.

The ferrule 31 with a connecting mechanism includes a ferrule 1 and a connecting mechanism 32 provided in a rear end side of the ferrule 1.

The connecting mechanism 32 includes a first capillary 8 and a second capillary 33 (introducing cylinder body).

The second capillary 33 includes a capillary body 33a (body portion) provided at the rear end side of the first capillary 8, and an outer cylinder body 33b extending forward from the front end of the capillary body 33a.

The outer cylinder body 33b can accommodate the first capillary 8. The rear end 1c of the ferrule 1 is inserted through the outer cylinder body 33b. Preferably, the capillary body 33a and the outer cylinder body 33b are formed integrally with each other.

The second capillary 33 may be made of metal, plastic, and the like.

The capillary body 33a is formed in a substantially cylindrical shape with the central axis thereof corresponding with the rear end side of the first capillary 8.

As in the second capillary 9 of the optical connector 11, the capillary body 33a includes an optical fiber inserting hole 20 through which the optical fiber 13 is inserted.

The optical fiber inserting hole 20 includes a guide hole 20a, an introducing hole 20b, and a standard diameter portion 20c. The guide hole 20a guides the optical fiber 13 to the optical fiber alignment hole 8a of the first capillary 8 and accommodates the coating 13b. The introducing hole 20b extends backward from the guide hole 20a. The standard diameter portion 20c extends backward from the introducing hole 20b.

The outer cylinder body 33b is formed in a substantially cylindrical shape with a flange 7a formed at a front end thereof.

A rear end 1c of the ferrule 1 is inserted at the front end of the outer cylinder body 33b. In the illustrated example, the inner diameter of the outer cylinder body 33b is made substantially equal to the outer diameter of the ferrule 1 and that of the first capillary 8.

An adhesive introducing hole 7c for introducing adhesives may be formed in the outer cylinder body 33b at a position corresponding to the first capillary 8.

The ferrule 1 may be loosely accommodated in and thus movable within the outer cylinder body 33b. The ferrule 1 may alternatively be press-fit into and fixed to the outer cylinder body 33b. The outer cylinder body 33b may be fixed to the ferrule 1 with adhesives.

Figure 14:
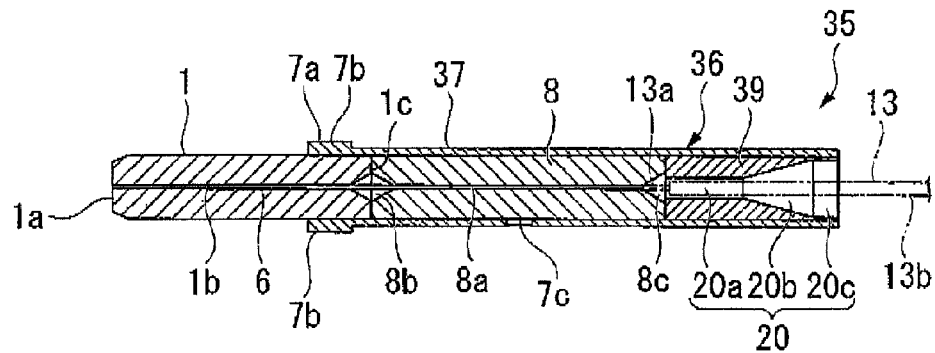
FIG. 14 is a side cross-section of the ferrule with a connecting mechanism.
Figure 15:
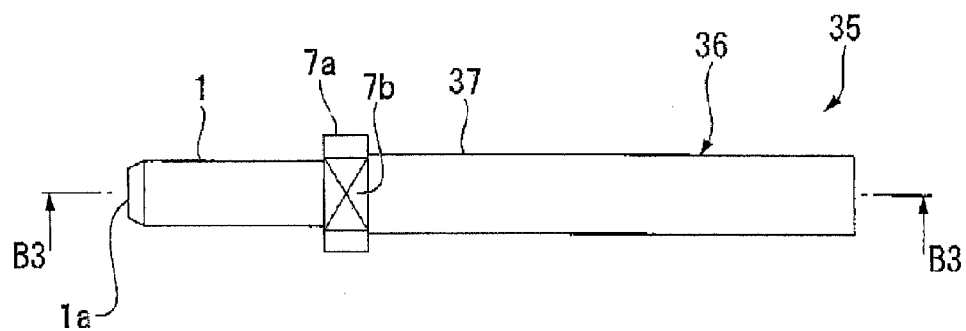
FIG. 15 is a plan view of the ferrule with a connecting mechanism.

FIGS. 14 and 15 show another example of a ferrule with a connecting mechanism. FIG. 14 is a side cross-section of the ferrule 35 with a connecting mechanism. FIG. 14 is a cross-section taken along line B3-B3 in FIG. 15. FIG. 15 is a plan view of the ferrule 35 with a connecting mechanism.

The ferrule 35 with a connecting mechanism includes a ferrule 1 and a connecting mechanism 36 provided at the rear end side of the ferrule 1.

The connecting mechanism 36 includes an outer cylinder body 37, a first capillary 8, and a second capillary 39. A rear end 1c of the ferrule 1 is inserted through the outer cylinder body 37.

The outer cylinder body 37 is formed in a substantially cylindrical shape with a flange 7a formed at a front end thereof.

The rear end 1c of the ferrule 1 is inserted in the outer cylinder body 37 from the front. The first capillary 8 is inserted in the outer cylinder body 37 at a rear end side of the ferrule 1. In the illustrated example, the inner diameter of the outer cylinder body 37 is made substantially equal to the outer diameter of the ferrule 1 and that of the first capillary 8.

An introducing portion 8b may be formed as a hole at a front end of the first capillary 8. The diameter of the introducing portion 8b becomes gradually smaller toward the optical fiber alignment hole 8a from the front end surface. An introducing portion 8c may be formed as a hole at the rear end of the first capillary 8. The diameter of the introducing portion 8b becomes gradually smaller toward the optical fiber alignment hole 8a from the rear end surface.

The second capillary 39 is formed in a substantially cylindrical shape. In the illustrated example, an outer diameter of the second capillary 39 is substantially equal to an inner diameter of the outer cylinder body 37.

The second capillary 39 is inserted into the outer cylinder body 37 with the central axis thereof corresponding with the rear end side of the first capillary 8.

An optical fiber inserting hole 20, through which the optical fiber 13 is inserted, is formed in second capillary 39 formed along an axis line thereof.

Figure 16:
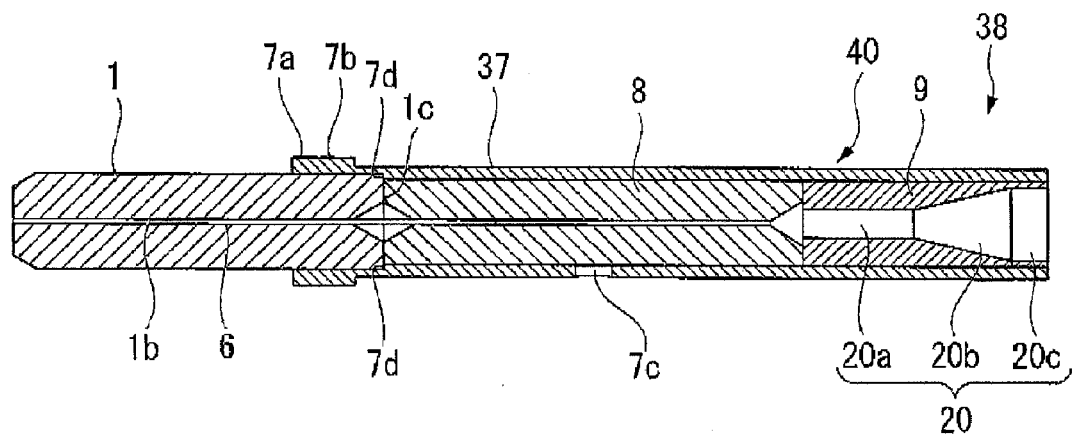
FIG. 16 is a side cross-section of the ferrule with a connecting mechanism.

FIG. 16 shows another example of a ferrule with a connecting mechanism. A connecting mechanism 40 of a ferrule 38 with a connecting mechanism differs from the ferrule 35 with a connecting mechanism shown in FIGS. 14 and 15 in that a stepped portion 7d is formed at an inner side of the outer cylinder body 7. The stepped portion 7d, against which the rear end 1c of the ferrule 1 abuts, functions as a stopper for restricting backward movement of the ferrule 1.

The end surface 6b of the rear end 6a is not necessarily formed as a curved convex surface, but may be an end surface with a diameter-reducing portion.

Figure 17:
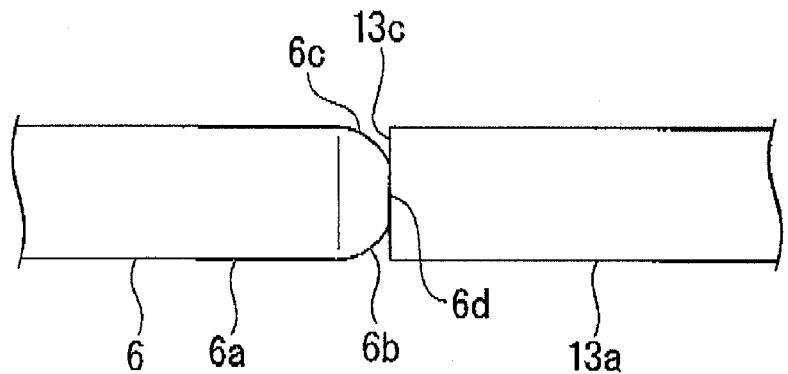
FIG. 17 illustrates another example of a rear end surface of a pre-assembled optical fiber.
Figure 18:
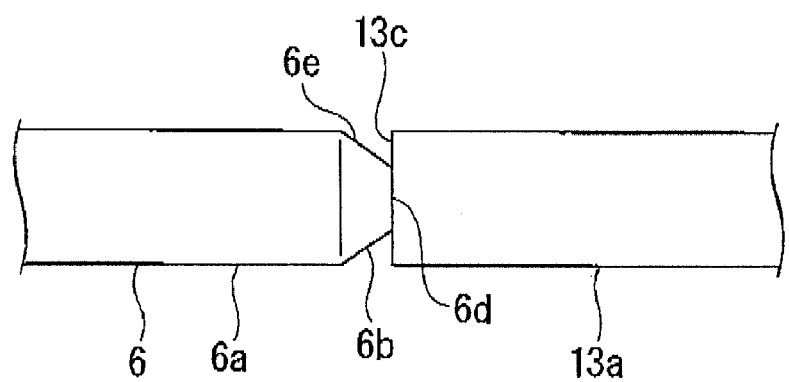
FIG. 18 illustrates a further example of a rear end surface of a pre-assembled optical fiber.
Figure 19:
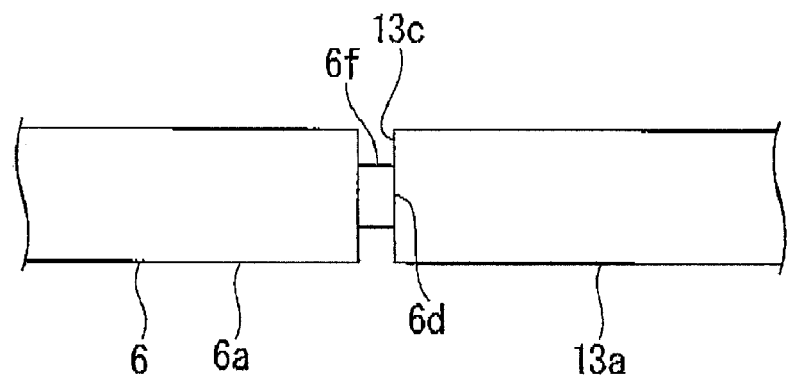
FIG. 19 illustrates a still further example of a rear end surface of a pre-assembled optical fiber.

FIGS. 17 to 19 are schematic structural views each showing an exemplary end surface with a diameter-reducing portion.

The end surface 6b shown in FIG. 17 includes a diameter-reducing portion 6c, of which outer diameter becomes gradually smaller toward the end thereof.

In the illustrated example, the diameter-reducing portion 6c has an angle of inclination with respect to the optical fiber axial direction becoming gradually larger toward the end thereof, and an outer surface with a curved cross-section. The central portion 6d of the end surface 6b is formed flat. The central portion 6d preferably includes a core of the optical fiber 6.

The thus shaped diameter-reducing portion 6c may be formed by melting an end of the cleaved optical fiber through arc discharging or the like, while controlling the amount of heat so as to melt only the edge portion of the clad.

The diameter-reducing portion 6e shown in FIG. 18 has an outer diameter which becomes gradually smaller toward the end thereof, and the angle of inclination with respect to the optical fiber axial direction is substantially constant.

The thus-shaped diameter-reducing portion 6e may be easily formed by mechanically polishing the peripheral portion of the end of the cleaved optical fiber.

Preferably, an outer diameter of the diameter-reducing portion 6f shown in FIG. 19 is substantially constant with respect to the optical fiber axial direction. Preferably, the outer diameter of the diameter-reducing portion 6f is substantially equal to the core diameter.

The thus-shaped diameter-reducing portion 6f may be formed by melting and then removing portions other than the core, for example by using fluoric acid.

Thus, PC-connection can be readily established at the end surface 6b having a diameter-reducing portion, with the abutting force focused on the portion including the core.

Figure 20:
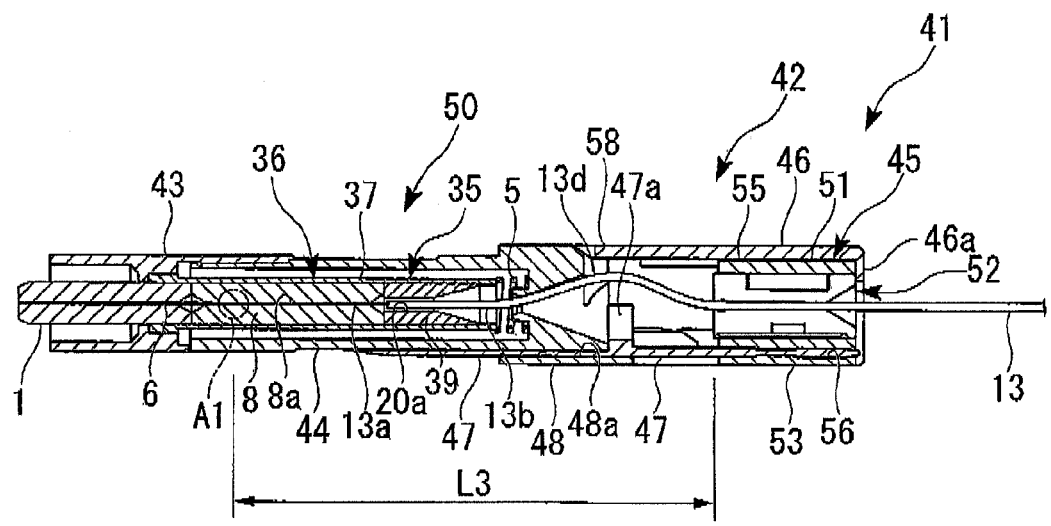
FIG. 20 is a side cross-section of an optical connector according to another embodiment of the invention.
Figure 21:
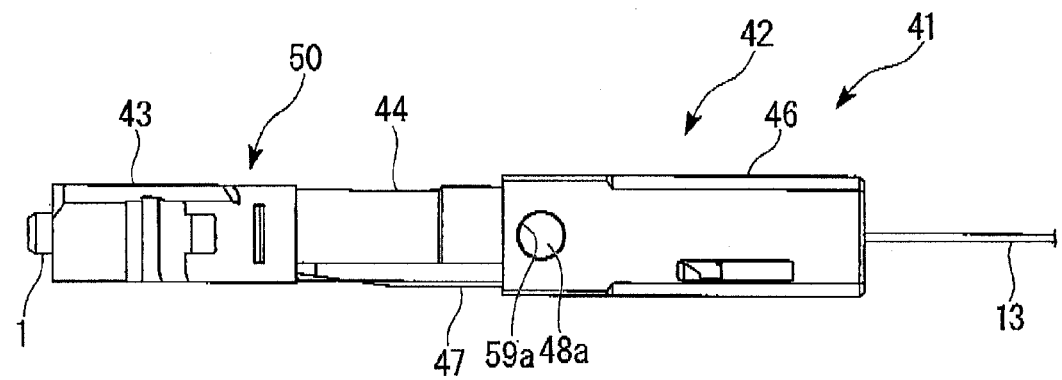
FIG. 21 is a side view of the optical connector.
Figure 22A:
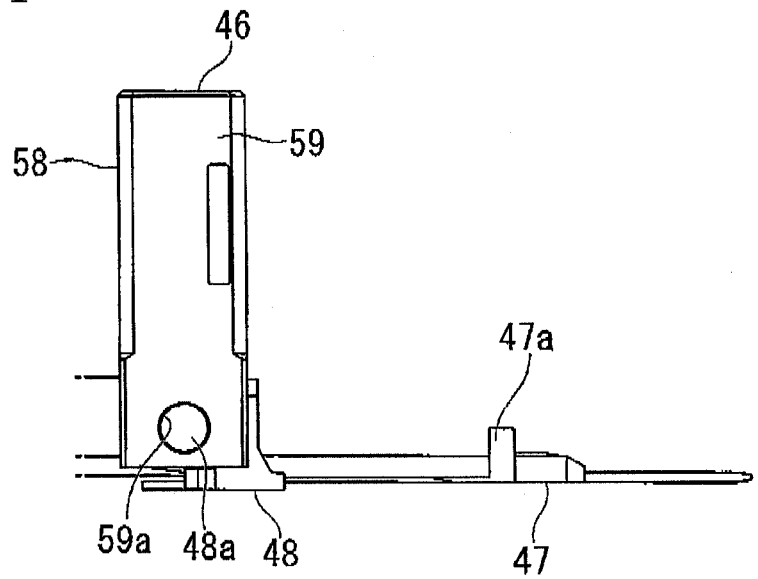
FIG. 22A is a side view of a movable receptacle and an anchor cover.
Figure 22B:
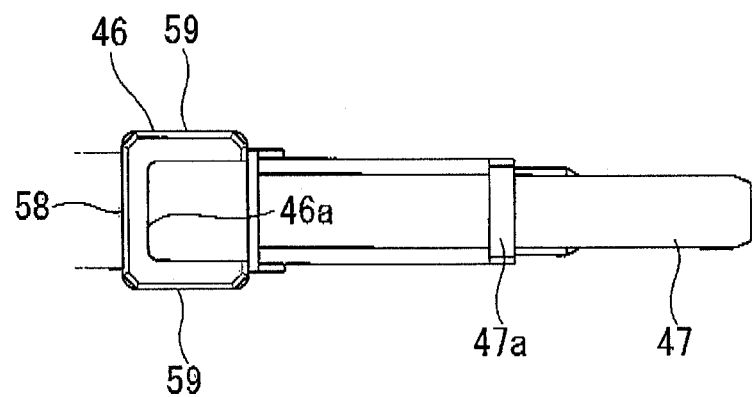
FIG. 22B is a plan view of the movable receptacle and the anchor cover.
Figure 23:
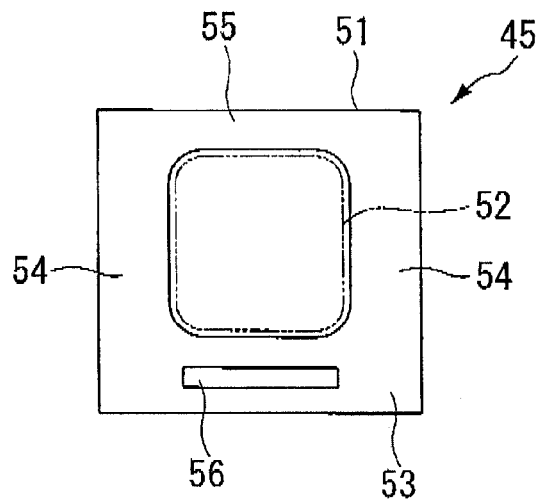
FIG. 23 is a front view of a holder.
Figure 24:
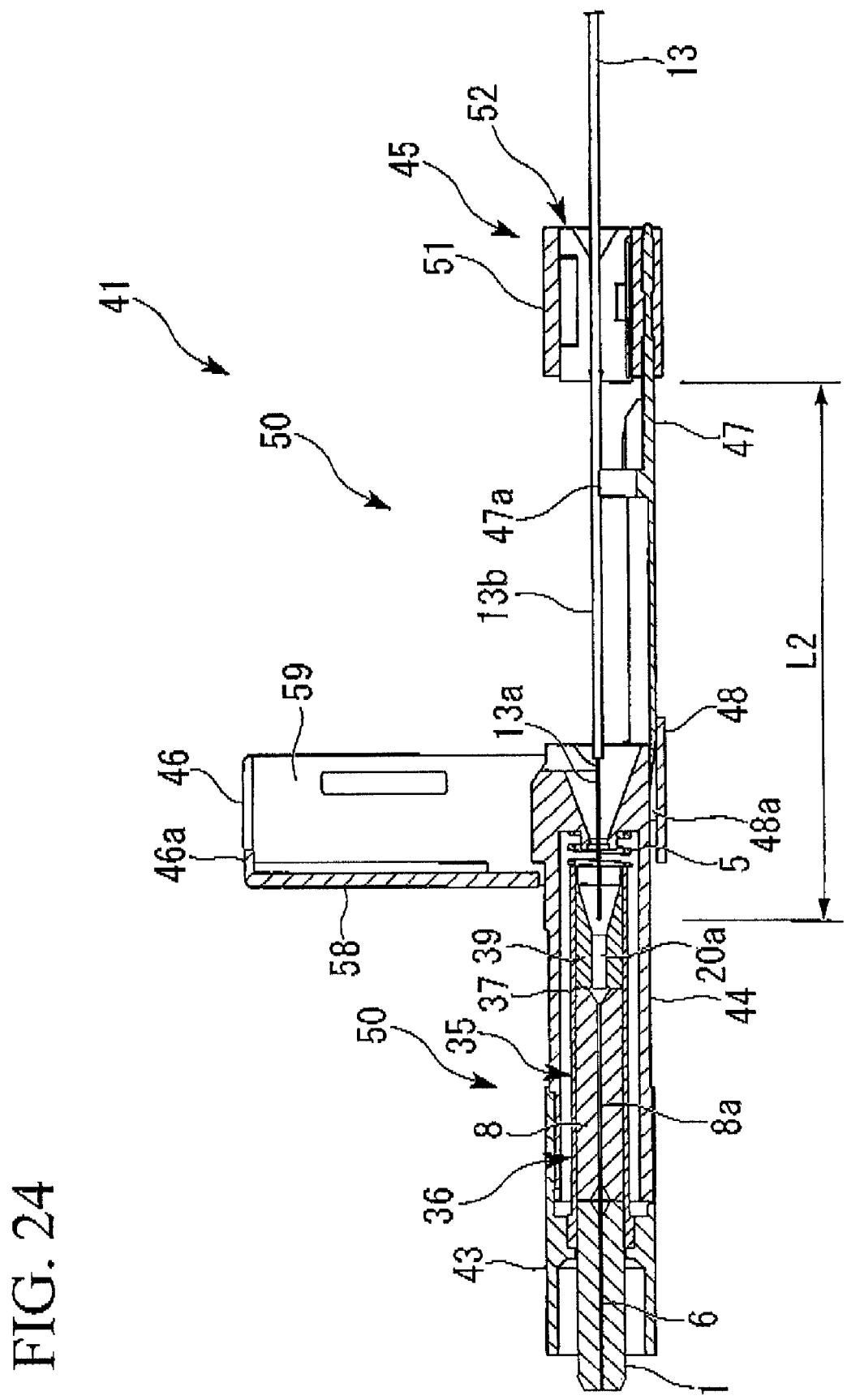
FIG. 24 is a side cross-section of an optical connector.
Figure 25:
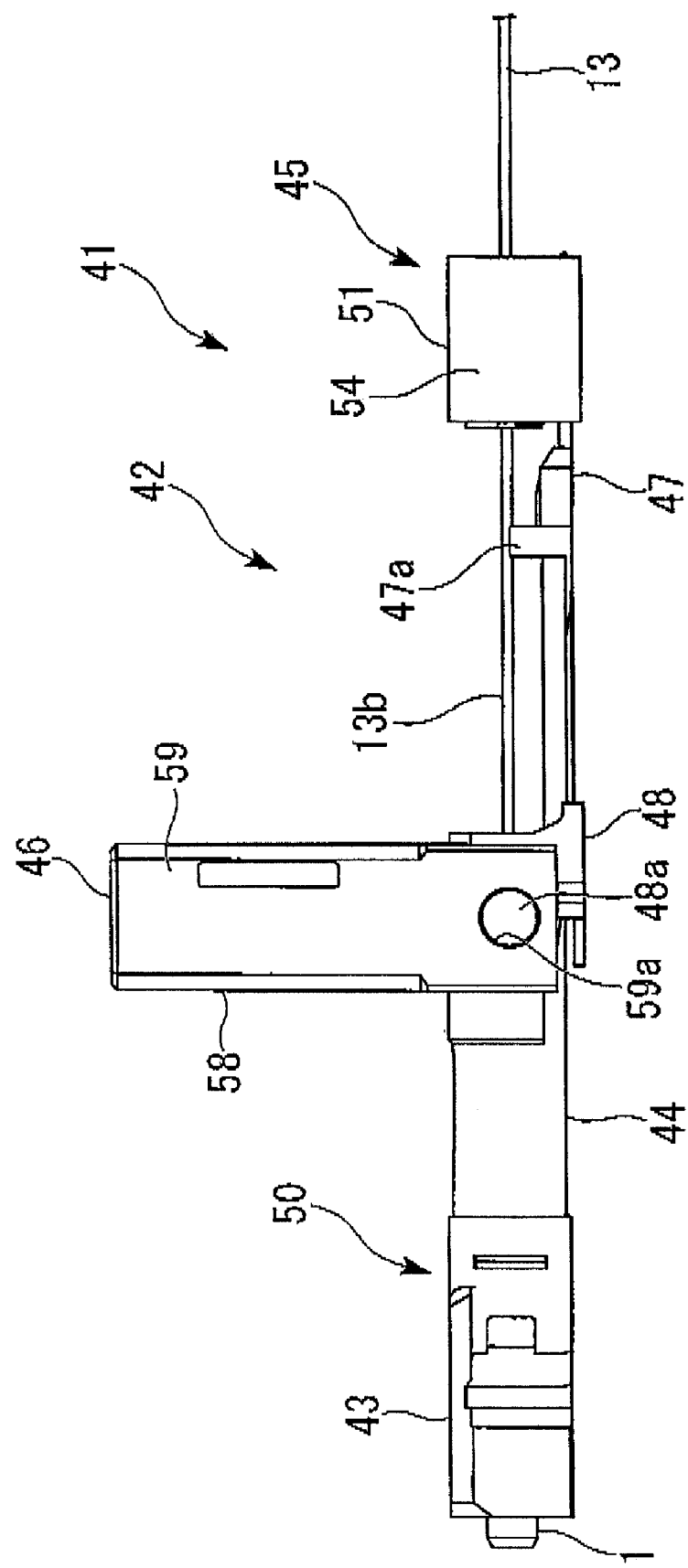
FIG. 25 is a side view of an optical connector.
Figure 26:
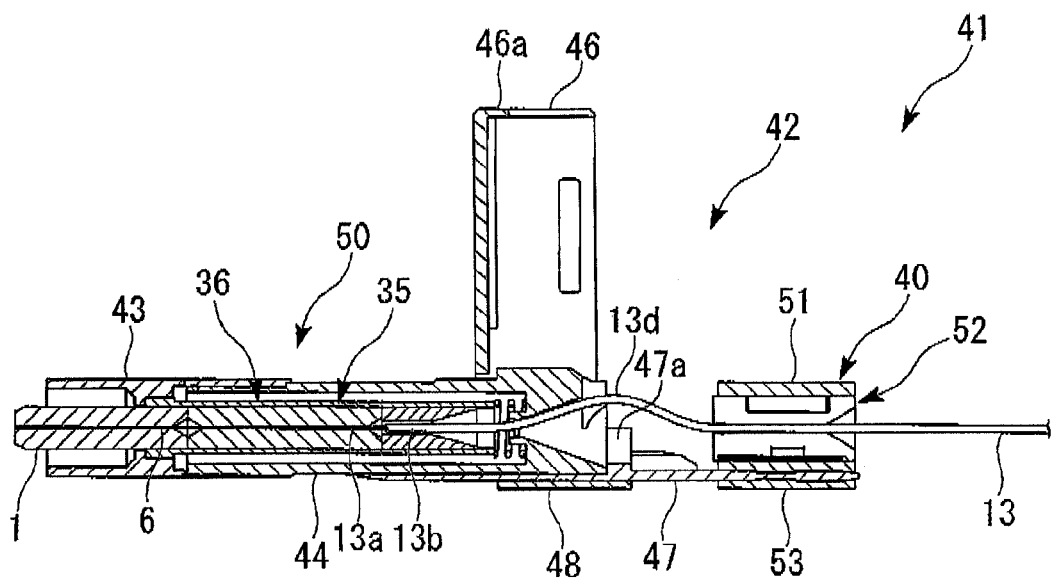
FIG. 26 is a side cross-section of the optical connector.
Figure 27:
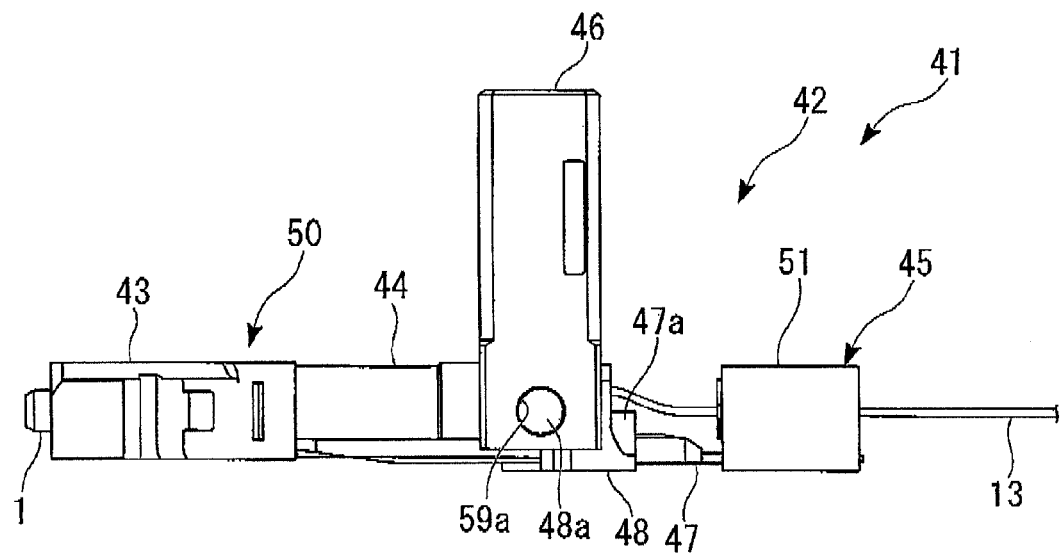
FIG. 27 is a side view of the optical connector.

FIGS. 20 and 21 show an optical connector 41 according to a second embodiment of the invention. FIG. 20 is a side cross-section of the optical connector 41. FIG. 21 is a side view of an exterior of the optical connector 41. FIG. 22 shows an anchor cover 46. FIG. 22A is a side view, and FIG. 22B is a plan view. FIG. 23 is a front view of a holder 45. FIG. 24 is process chart illustrating anchoring of the holder 45 to a connector body 50 in an assembly process of the optical connector 41, and shows a side cross-section of the optical connector 41. FIG. 25 is a side view of the optical connector 41. FIG. 26 is a process chart following FIG. 24, and shows a side cross-section of the optical connector 41. FIG. 27 is a process chart following FIG. 25, and is a side view of the optical connector 41.

As shown in FIGS. 20 to 23, the optical connector 41 includes a connector body 50 and an anchor mechanism 42 in which optical fiber 13 is anchored to the connector body 50.

The connector body 50 includes a ferrule 35 with a connecting mechanism, a plug frame 43 mounted at an outside of the ferrule 35 with a connecting mechanism, a stop ring 44 attached to the plug frame 3, and an urging means 5 provided in the stop ring 44.

The connector body 50 may be an SC (Single fiber Coupling) optical connector. The illustrated example shows a state in which a knob (coupling) (not shown) is removed (i.e., a state called SC2). By attaching the knob outside thereof, an SC optical connector can be obtained. Examples of the SC optical connector may include an F04 optical connector (optical connector plug) provided in JIS C5973.

The anchor mechanism 42 includes a movable receiving piece 47, a holder 45, and an anchor cover 46 (connecting portion). The movable receiving piece 47 is provided in the connector body 50 so as to move in the front-rear direction. The holder 45 is for holding the optical fiber 13. The anchor cover 46 anchors the holder 45 to the connector body 50.

The movable receiving piece 47 is an elongated plate member. The movable receiving piece 47 is inserted in the guide hole 48a penetrating the rear end block portion 48 in the front-rear direction, and may slide along the front-rear direction of the optical connector 11. The rear end block portion 48 is attached to the rear end of stop ring 44.

The length of the movable receiving piece 47 protruding backward from the connector body 50 may be varied due to the sliding movement.

The holder 45 includes a cylindrical jacket 51 and a clamp body 52 inserted in the jacket 51.

The jacket 51 is formed in a cylindrical shape having a rectangular cross-section, and includes a bottom plate portion 53, side plate portions 54 extending from the side edge of the bottom plate portion 53, and a top plate section 55. An insertion hole 56 is formed in the bottom plate portion 53 of the jacket 51 to penetrate the same in the front-rear direction.

The jacket 51 is attached to a rear end of the movable receiving piece 47 inserted in the insertion hole 56.

The clamp body 52, having the same configuration as that of the holder 15 shown in FIG. 4, includes an element unit 25, an element unit 25, and a clamp spring 26 mounted on the element unit 25.

The holder 45 slides along the longitudinal direction of the movable receiving piece 47 with the movable receiving piece 47 inserted in the insertion hole 56.

The anchor cover 46 includes an elongated plate-shaped top plate 58 and side plates 59 provided at both sides of the top plate 58 along the longitudinal direction of the top plate 58.

The anchor cover 46 is attached to the stop ring 44 of the connector body 50 via a rear end block portion 48. In particular, the anchor cover 46 is mounted on a rear end block portion 48 with an axis 48a formed in the rear end block portion 48 inserted in a shaft hole 59a formed at a longitudinal direction end of the both side plates 59. The anchor cover 46 rotates about the axis 48a.

In particular, the anchor cover 46 rotates between a closed position and an open position. In the closed position, the anchor cover 46 covers the movable receiving piece 47 (see FIGS. 20 and 21). In the open position, the anchor cover 46 rotates upward from the closed position and opens with respect to the movable receiving piece 47 (in a state in which the anchor cover 46 stands upright with respect to the movable receiving piece 47 (see FIGS. 24 and 25)).

As shown in FIGS. 24 and 25, the holder 45 attached to the movable receiving piece 47 drawn out at the rear side of the connector body 50 can be moved toward the connector body 50 altogether with the movable receiving piece 47.

As shown in FIGS. 26 and 27, when a contact projection 47a formed in the movable receiving piece 47 abuts against the rear end of the stop ring 44 (specifically, the rear end block portion 48) from backward, further forward movement of the holder 45 will be restricted (The position of the holder 45 at this point is called a "movement limit position").

As shown in FIGS. 24 and 26, in the moving process, the tip 13a of the optical fiber 13 is inserted in the guide hole 20a via the standard diameter portion 20c and the introducing hole 20b of the second capillary 9. Since the diameter of the introducing hole 20b becomes gradually smaller toward the front, the optical fiber 13 is smoothly introduced into the guide hole 20a.

The tip 13a of the optical fiber 13 is introduced into the optical fiber alignment hole 8a of the first capillary 8 through the guide hole 20a, and is spliced with the pre-assembled optical fiber 6.

As shown in FIG. 26, a part of the coating 13b of the optical fiber 13 is inserted and accommodated in the guide hole 20a.

As shown in FIGS. 20 and 24, the length L2 of the optical fiber 13 from the holder 45 to the tip 13a is longer than the distance L3 from the holder 45 to the rear end 6a of the pre-assembled optical fiber 6 at a position where the holder 45 is anchored to the connector body 50. For this reason, the optical fiber 13 abuts against the pre-assembled optical fiber 6 with sufficient force due to its own elasticity.

Preferably, the holder 45 is disposed while the optical fiber 13 is slightly bent. The reference numeral 13d in FIG. 26 denotes the bent portion.

When being bent, elasticity of the optical fiber 13 urges the tip 13a forward to stably press the tip 13a against the pre-assembled optical fiber 6. The connection of the optical fibers 6 and 13 is thus kept stable. Even if the optical fibers are used in hot environments for a long time, connection loss cannot occur.

As shown in FIGS. 20 and 21, when the anchor cover 46 is rotated from its open position to the closed position with the holder 45 located in a movement limit position, the holder 45 is accommodated in the anchor cover 46.

In the closed position, an anchor projection 46a formed at a longitudinal direction another end of the anchor cover 46, i.e., the most distant end from the pivot 48a, is disposed at the rear end side of the holder 45. The anchor projection 46a functions as a stopper for restricting the rearward movement of the holder 45 (see FIG. 22B).

Therefore, the anchor cover 46 functions as an anchor mechanism for anchoring the holder 45 and the optical fiber 13 to restrict the rearward movement thereof.

The structure of the anchor mechanism is not limited to the illustrated example, and may be any structure as long as it functions as an anchor means to restrict the rearward movement of the optical fiber 13.

As shown in FIG. 20, connection of the optical fiber 13 and the pre-assembled optical fiber 6 is kept stable by the anchor cover 46 anchoring the holder 45.

When the coating 13b of the optical fiber 13 is inserted in the guide hole 20a of the second capillary 9, the position and direction of the tip 13a are stabilized, and the connection of the optical fiber 13 to the pre-assembled optical fiber 6 is kept stable.

In the illustrated example, although the optical fiber 13 has a bent portion, since the optical fiber 13 is disposed along the axis direction with the coating 13b inserted in the guide hole 20a, the urging force toward the front due to bending is certainly transmitted to the tip 13a, and thus the connection of the optical fiber 13 and the pre-assembled optical fiber 6 is stabilized.

Figure 28:
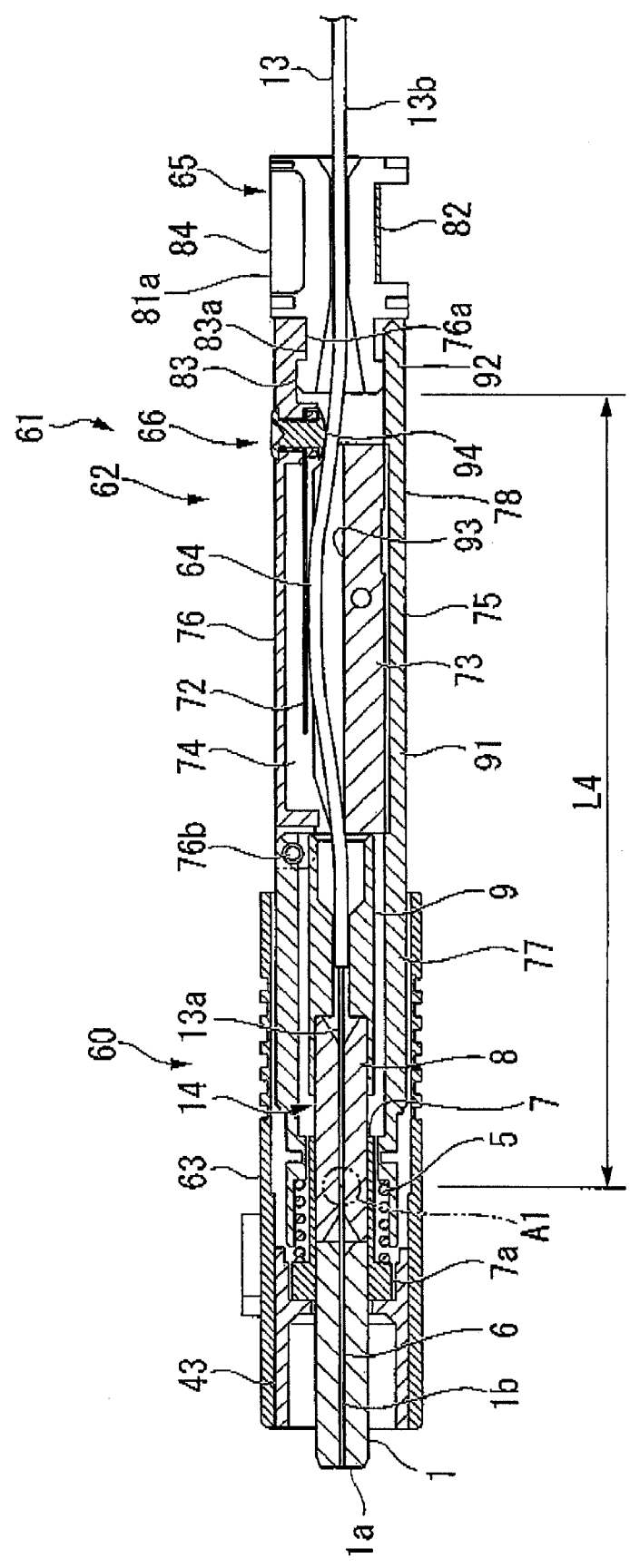
FIG. 28 is a side cross-section of an optical connector according to further embodiment of the invention.
Figure 29:
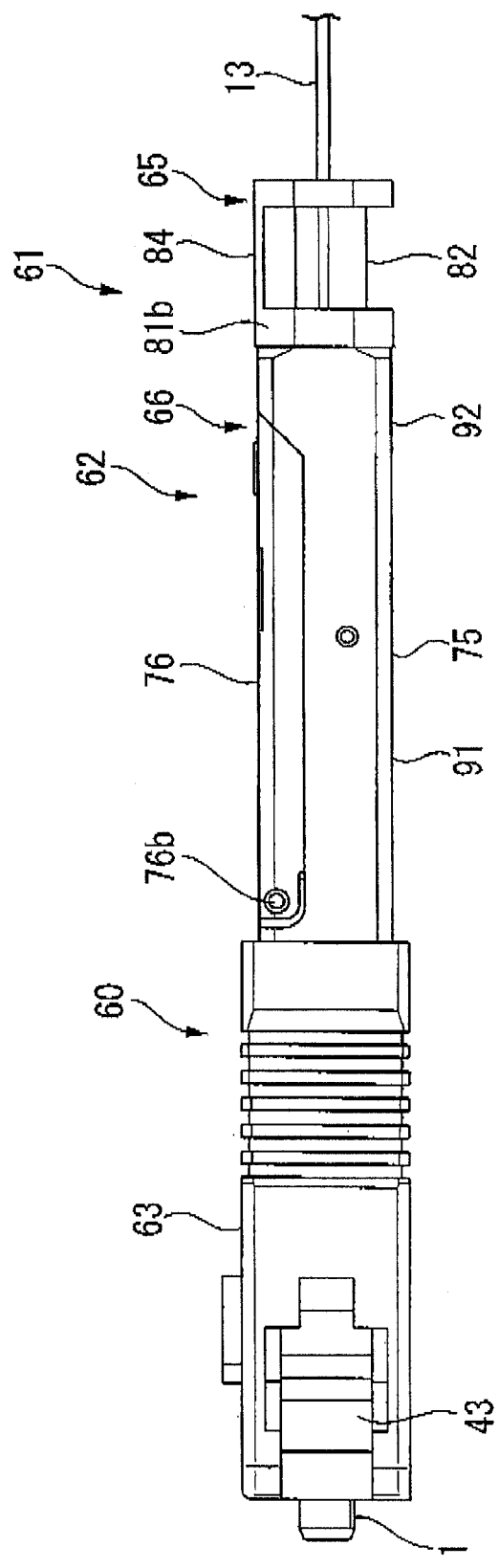
FIG. 29 is a side view of the optical connector.
Figure 30:
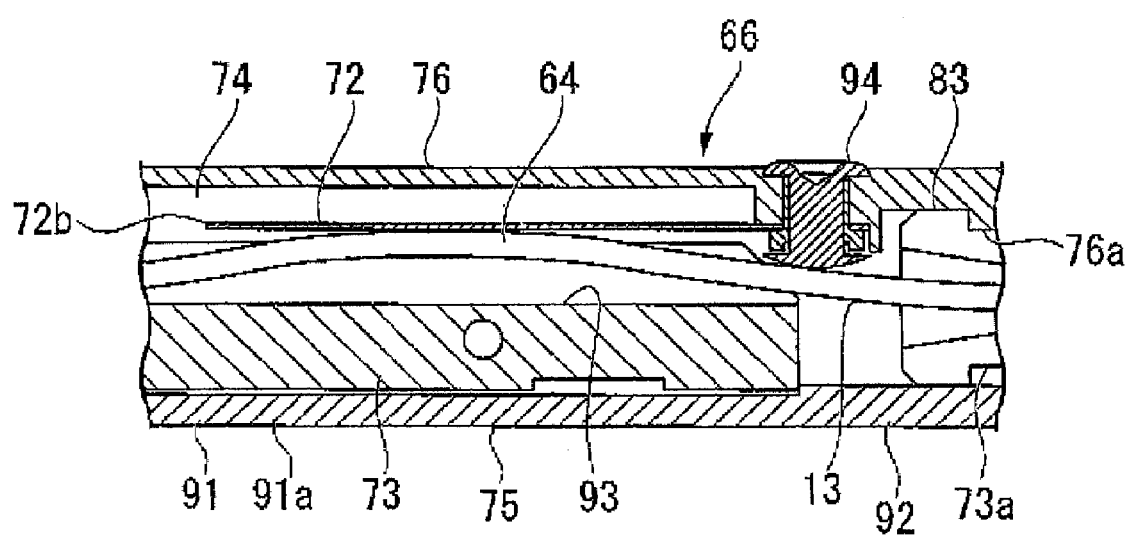
FIG. 30 is a cross-section of main components of the connecting portion.
Figure 31:
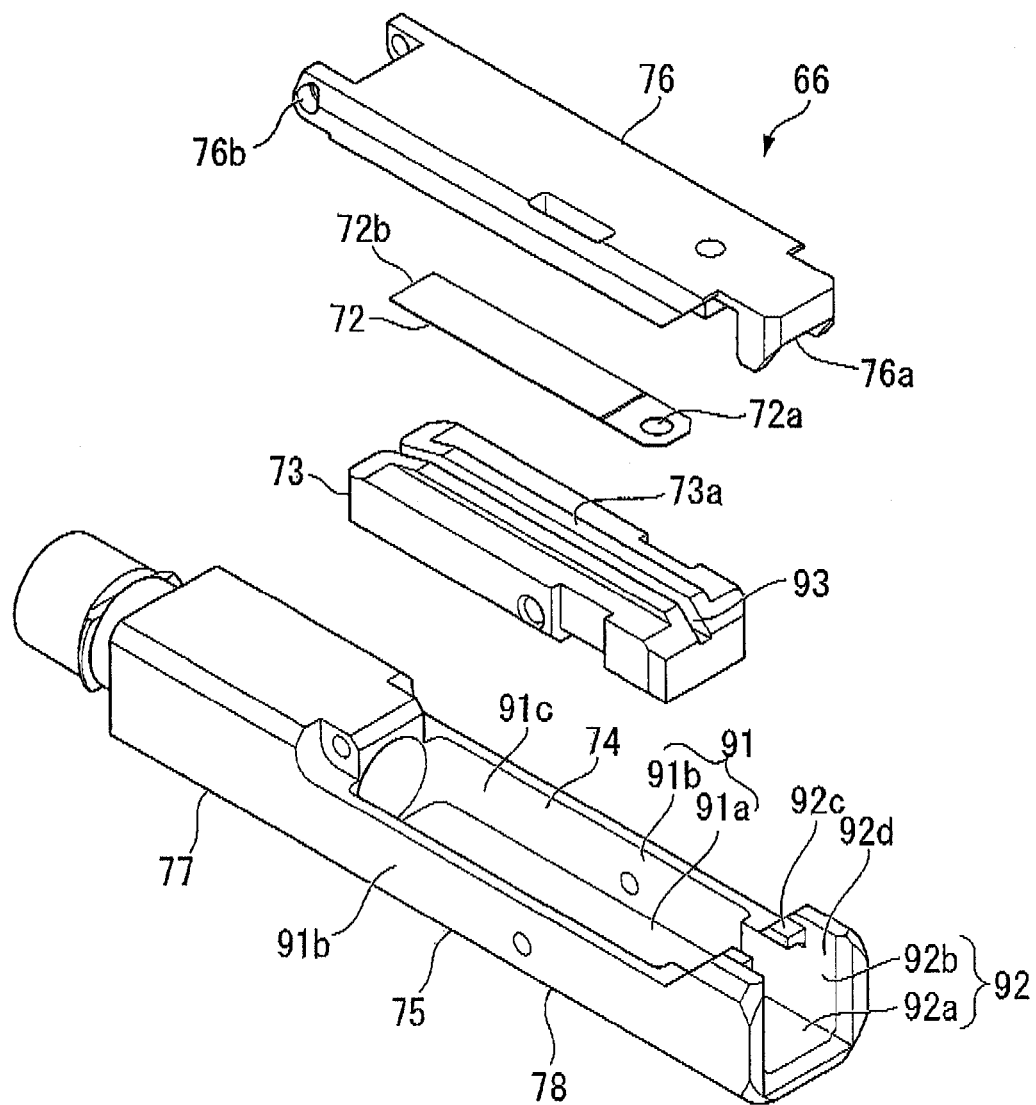
FIG. 31 is an exploded perspective view of the connecting portion.
Figure 32:
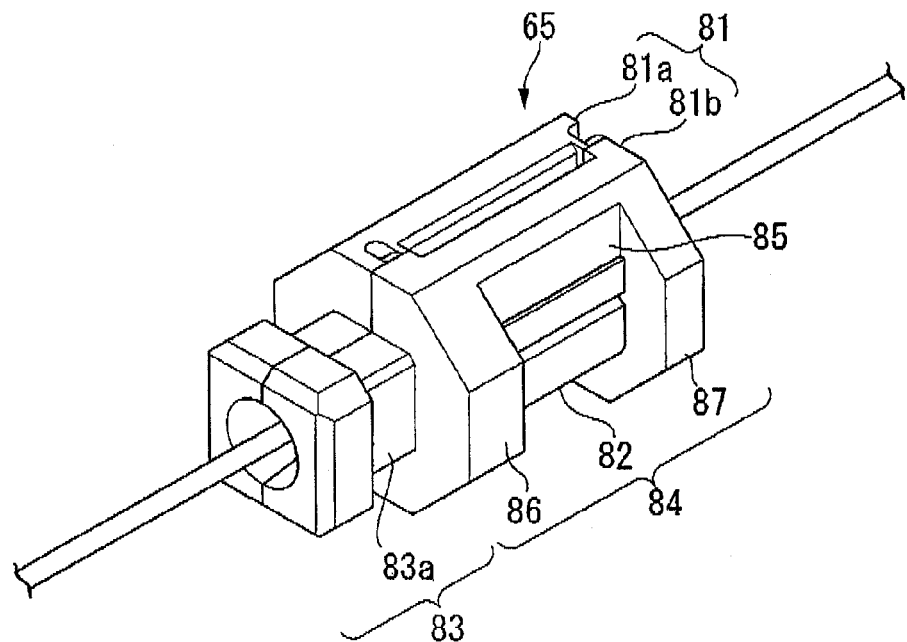
FIG. 32 is a perspective view of a holder.
Figure 33:
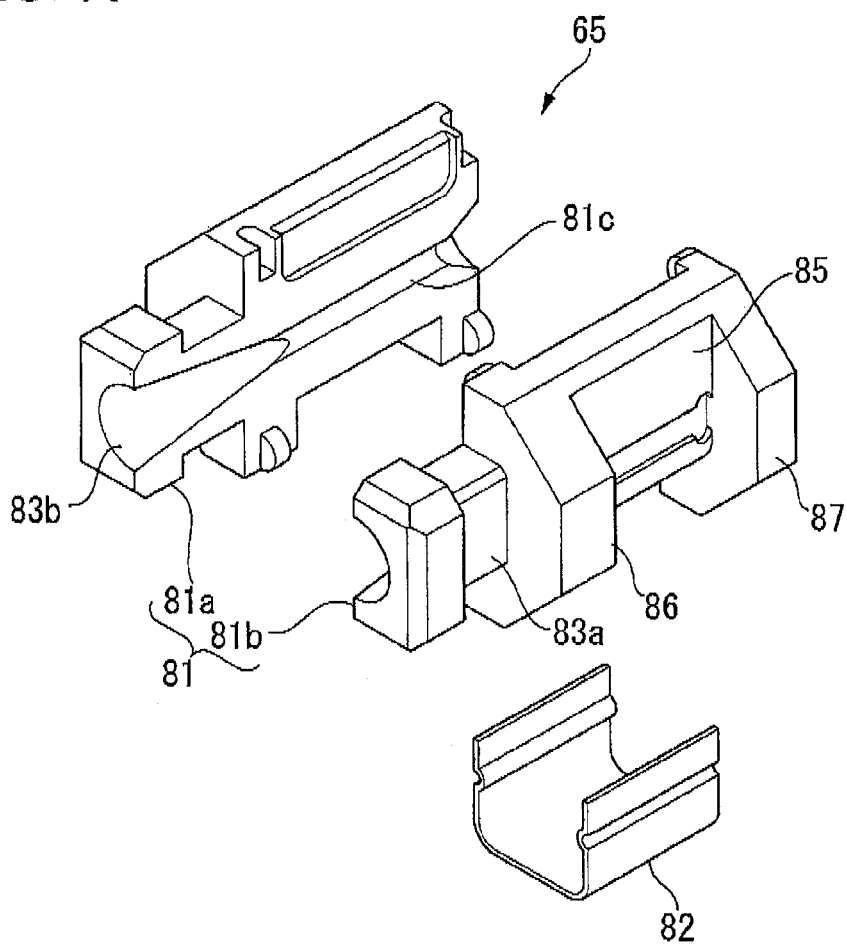
FIG. 33 is an exploded perspective view of the holder.
Figure 34:
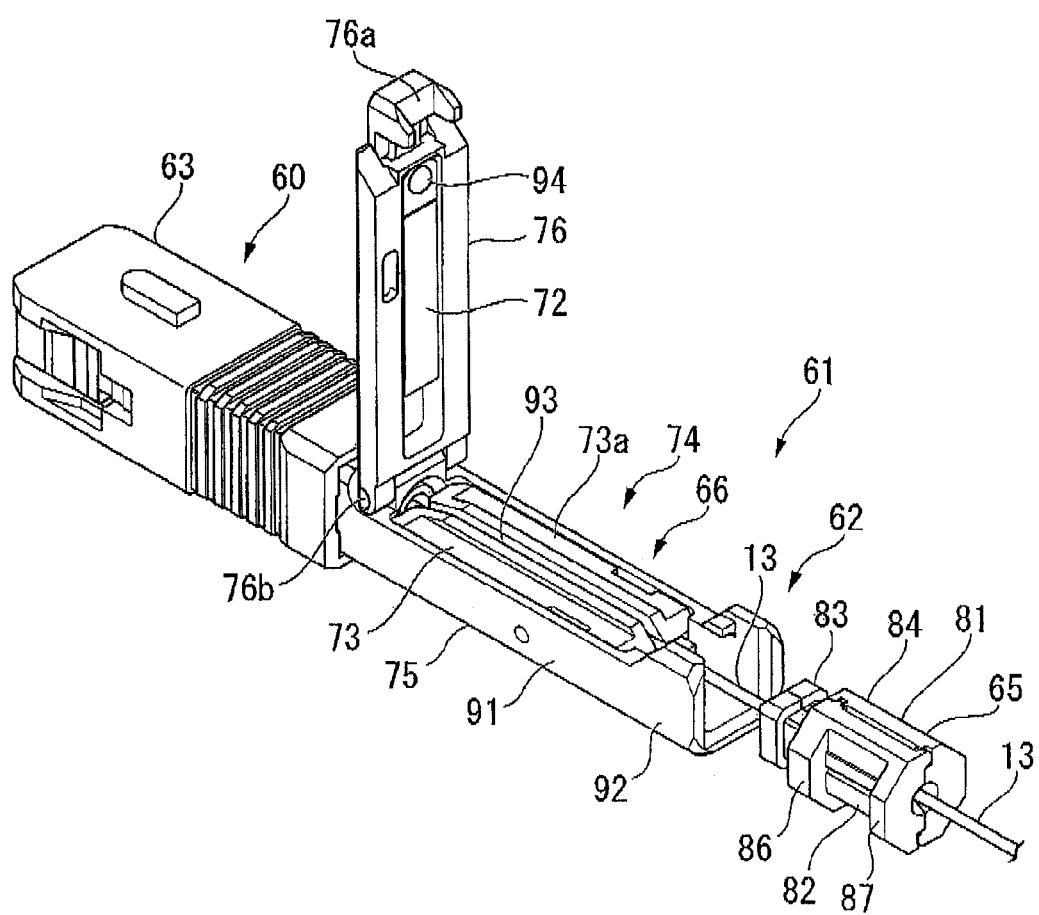
FIG. 34 is a perspective view of an optical connector.
Figure 35:
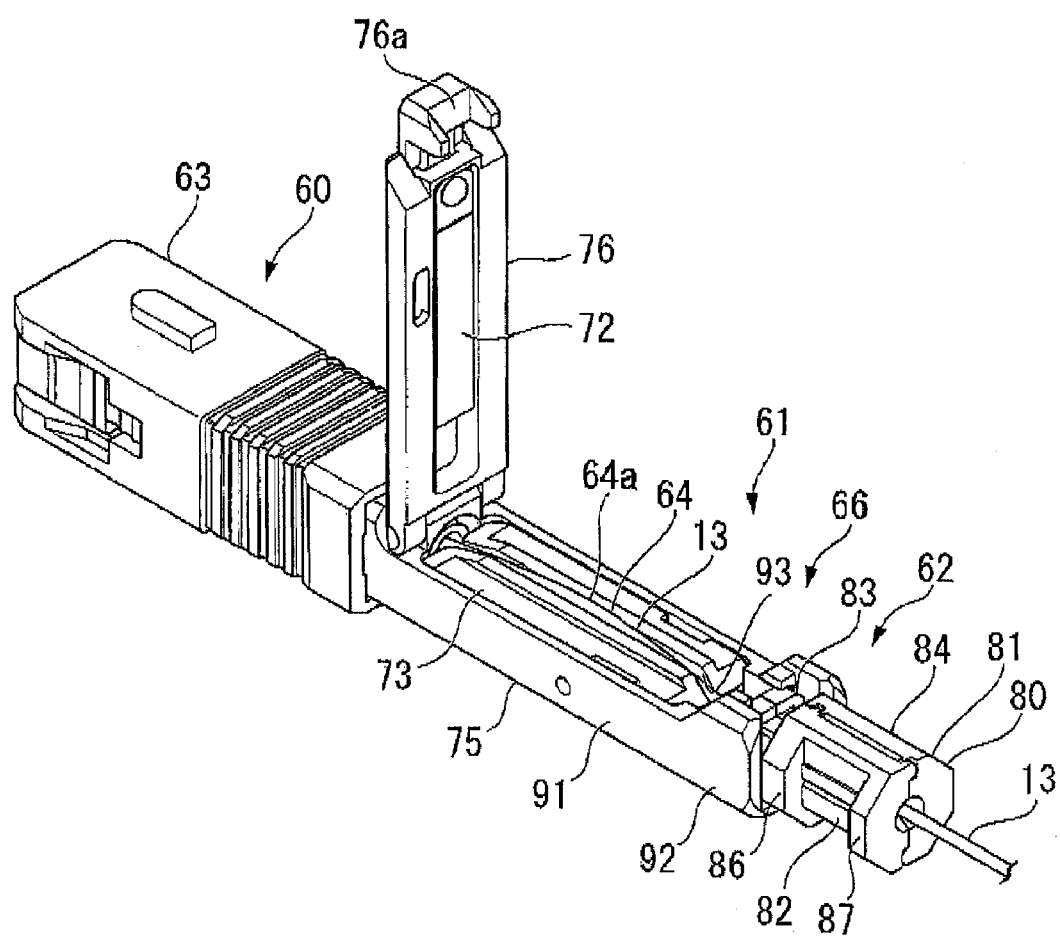
FIG. 35 is a perspective view of the optical connector.

FIGS. 28 and 29 show an optical connector 61 according to a third embodiment of the invention. FIG. 28 is a side cross-section of the optical connector 61. FIG. 29 is a side view of the optical connector 61. FIG. 30 is a cross-section of main components of the connecting portion 66. FIG. 31 is an exploded perspective view of the connecting portion 66. FIG. 32 is a perspective view of a holder 65. FIG. 33 is an exploded perspective view of the holder 65. FIGS. 34 and 35 are perspective views of the optical connector 61 illustrating operation of the holder 65.

As shown in FIGS. 28 to 31, the optical connector 61 includes a connector body 60 and an anchor mechanism 62 for anchoring the optical fiber 13 to the connector body 60.

The connector body 60 includes a ferrule 14 with a connecting mechanism, a ferrule 14 with a connecting mechanism, a plug frame 43 mounted on the outside of the ferrule 14 with a connecting mechanism, an urging means 5, and a knob 63 provided in the outside of the plug frame 43.

The anchor mechanism 62 includes a holder 65 for holding the optical fiber 13, and a connecting portion 66 for connecting the holder 65 to the connector body 60.

As shown in FIGS. 30 and 31, the connecting portion 66 includes a connector body 75, a cover 76, a pressing member 72, and a positioning member 73. The optical fiber 13 may be inserted through the connector body 75. The cover 76 opens and closes an opening 74 of the connector body 75. The pressing member 72 presses the optical fiber 13 within the connector body 75. The positioning member 73 positions the optical fiber 13.

In the embodiments, the rear end 6a of the pre-assembled optical fiber 6 and the tip 13a of the optical fiber 13 are spliced within a capillary of the connecting mechanism.

Although not shown, the length of the pre-assembled optical fiber 6 may be shorter than that of the ferrule 1, and the tip 13a of the optical fiber 13 may be inserted into the optical fiber introducing hole 1b of the ferrule 1 to splice the optical fiber 13 and the pre-assembled optical fiber 6 so that the splicing point may be positioned within the optical fiber introducing hole 1b of the ferrule 1. In this case, the connecting mechanism is unnecessary.

The connector body 75 includes a stop ring portion 77 inserted into the connector body 60, and a body portion 78 formed at a rear end side of the stop ring portion 77.

The stop ring portion 77 is formed as a sleeve which accommodates the rear portion of the ferrule 14 with a connecting mechanism. The stop ring portion 77 is attached to the rear end of the plug frame 43.

The body portion 78 extends at the rear side of the connector body 60. The body portion 78 includes an accommodating portion 91 and an insertion holder 92. The accommodating portion 91 includes an opening 74 formed in an upper surface thereof. The insertion holder 92 holds the holder 65 inserted therein.

The accommodating portion 91 includes a bottom plate 91a and side plates 91b provided to stand from both edges of the bottom plate 91a. The accommodating portion 91 accommodates the positioning member 73 in an internal space 91c defined by the bottom plate 91a and the side plates 91b. The accommodating portion 91 includes the opening 74 at the upper side thereof.

The insertion holder 92 is formed at a rear end side of the accommodating portion 91. The insertion holder 92 includes a bottom plate 92a, side plates 92b provided to stand from the edges on both sides of the bottom plate 92a. The insertion holder 92 also includes upper projections 92c formed at an inner side of the side plates 92b. The holder 65 is inserted in an internal space 92d defined by the insertion hole 92, side plates 92b and upper projections 92c.

As shown in FIG. 28, the connecting portion 66 is formed so that the length of the optical fiber 13 from the holder 65 to the tip 13a is longer than the distance L4 from the holder 65 to the rear end 6a of the pre-assembled optical fiber 6 at a position where the holder 65 is anchored to the connector body 60.

The positioning member 73 is formed as a block having a substantially rectangular cross-section. A guide groove 93 is formed along the longitudinal direction in the upper surface 73a of the positioning member 73.

The guide groove 93 positions the optical fiber 13 to enable the pressing member 72 to press the optical fiber 13. The guide groove 93 is formed along the longitudinal direction (i.e., the front-rear direction) of the connector body 75.

The width of the guide groove 93 is determined so that the posture of a later-described bent portion 64 can be kept to be pressed by the pressing member 72. That is, the width is determined such that a lateral shift or inclination of the position of the bent portion 64 can be prevented. The width of the guide groove 93 is preferably wider than that of the optical fiber 13 so as not to prevent the movement of the optical fiber 13.

The depth of the guide groove 93 is determined such that the pressing member 72 can press the bent portion 64. In particular, the depth of the guide groove 93 is determined such that the vicinity of the top 64a of the bent portion 64 protrudes upward from the upper surface 73a.

In the illustrated example, the guide groove 93 is formed substantially perpendicular to the upper surface 73a. In a state in which the positioning member 73 is accommodated in the accommodating portion 91, the guide groove 93 is positioned along a substantially perpendicular direction to the bottom plate 91a.

As shown in FIGS. 30 and 31, the pressing member 72 is for ensuring the force for urging the bent portion 64, and any member may be used as long as it can press the bent portion 64 with moderate pressure. Preferably, the pressing member 72 is formed as an elastically deformable plate.

If the pressing member 72 is configured to press the bent portion 64 with the pressing member 72 elastically deformed upward and the elastic repulsive force pressing the bent portion 64, appropriate and stable pressing force can be preferably obtained. The pressing member 72 can be made of any material, such as metal and resin.

In the illustrated example, the pressing member 72 is formed as an elongated plate along the longitudinal direction of the connector body 75. An opening 72a for fixation is formed in an end portion (rear end) of the pressing member 72.

The pressing member 72 is fixed to a lower surface of the cover 76 substantially in parallel with the cover 76 by a fixture 94 inserted in the opening 72a.

In the illustrated example, pressing member 72 is spaced apart from the cover 76 except for an end portion (rear end)

which is fixed to the cover 76. The pressing member 72 may be elastically deformed so that a tip 72a is moved up and down.

As shown in FIGS. 30 and 31, the cover 76 is formed as a plate having a substantially rectangular cross-section when seen as a plan view. The cover 76 closes the opening of the connector body 75.

An anchor projection 76a is formed to extend downward at the rear end of cover 76. The anchor projection 76a is formed to be fit into a fitting recess 83a of the holder 65 so as to prevent removal of the holder 65.

The cover 76 is rotatably connected to the connector body 75 via a hinge 76b formed at a front end thereof. The cover 76 opens and closes the opening when rotated about the hinge 76b.

As shown in FIGS. 32 and 33, the holder 65 includes an element unit 81 and a clamp spring 82 mounted on the element unit 81.

The element unit 81 includes an insert portion 83 formed at the tip side, and a clamp portion 84 provided at the rear end side.

The insert portion 83 is formed as a cylinder having a rectangular cross-section. The fitting recess 83a is provided in an outer peripheral surface. The insert portion 83 includes an insertion hole 83b of which inner diameter becomes gradually larger toward the front end. The insert portion 83 is formed to be inserted from the rear end side into the insertion holder 92 of the connecting portion 66.

The clamp portion 84 includes a body portion 85 having a substantially rectangular cross-section, and flanges 86 and 87 formed in the front and rear ends of the body portion 85. The flanges 86 and 87 extend outward from the external surface of the body portion 85.

The element unit 81 consists of two elements 81a and 81b, and holds the optical fiber 13 between the elements 81a and 81b due to the elasticity of the clamp spring 82.

An introducing groove 81c for introducing the optical fiber 13 is formed in one or both of the corresponding surfaces of the clamp portion 84.

Next, operation of the optical connector 61 will be described.

As shown in FIG. 34, the opening 74 of the connector body 75 is opened and the positioning member 73 is disposed in the accommodating portion 91.

Figure 36:
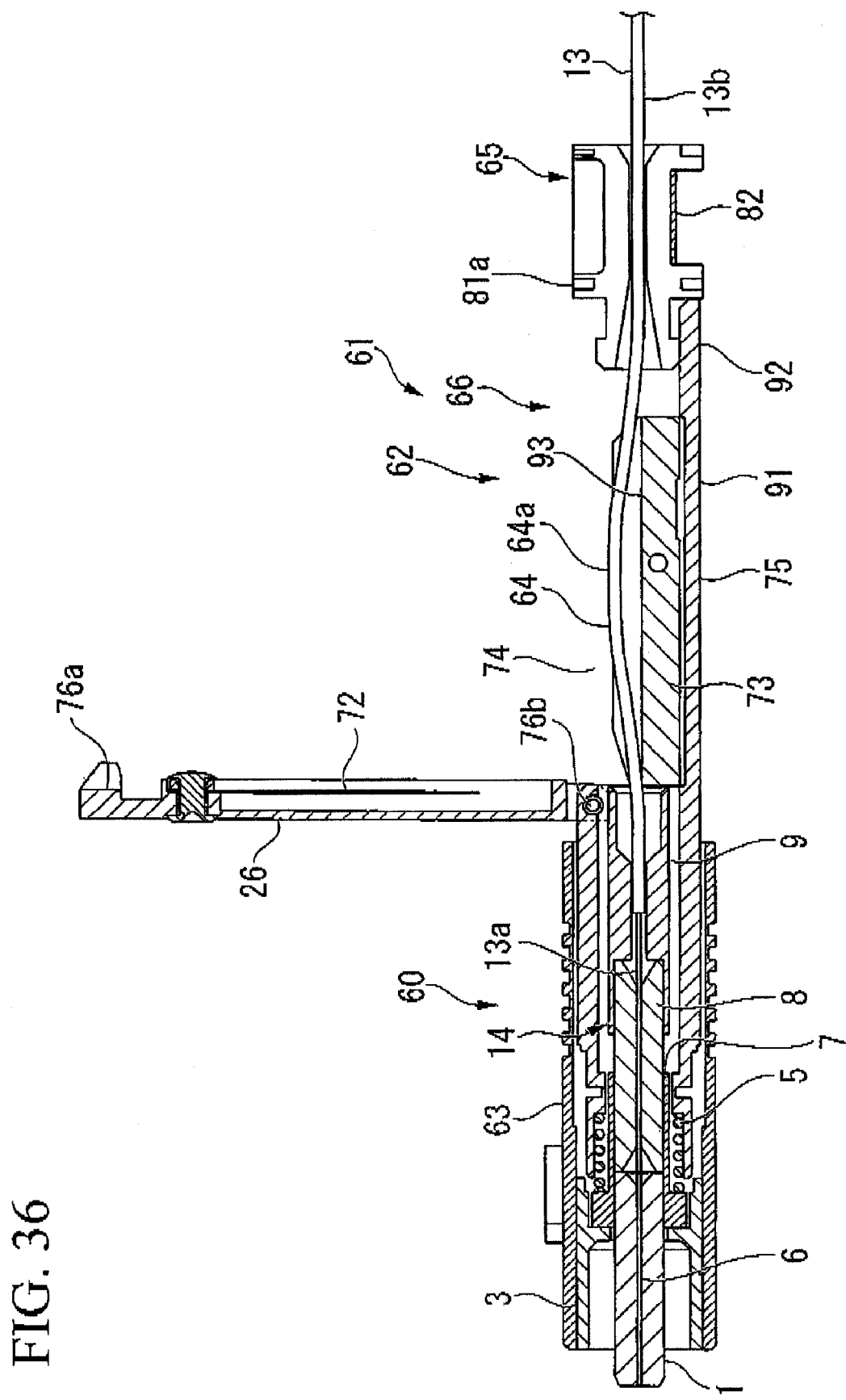
FIG. 36 is a side cross-section of an optical connector.

As shown in FIGS. 35 and 36, the holder 65 holding the optical fiber 13 is moved forward toward the connecting portion 66, and the insert portion 83 is inserted into the insertion holder 92.

At this time, the optical fiber 13 is introduced into the connector body 75, and then in the connector body 60 through the guide groove 93 of the positioning member 73.

When the flange 86 of the clamp portion 84 abuts against the rear end of the connector body 75, further forward movement of the holder 65 is restricted.

The tip 13a of the optical fiber 13 is introduced into the optical fiber alignment hole 8a of the first capillary 8 via the optical fiber inserting hole 20 of the second capillary 9. The tip 13a is then spliced with the pre-assembled optical fiber 6.

The end surface 6b of the rear end 6a of the pre-assembled optical fiber 6 in an optical-fiber-connection portion denoted by the reference numeral A1 in FIG. 28 is formed as a curved convex surface. As shown in FIG. 8, the end surface 6b is PC-connected to the tip 13a of the optical fiber 13.

As shown in FIGS. 35 and 36, the optical fiber 13 is slightly bent in the connector body 75. The elasticity of the optical fiber 13 due to the bending urges the tip 13a forward, and thus the optical fiber 13 is spliced with the pre-assembled optical fiber 6. The reference numeral 64 denotes the bent portion.

The bent portion 64 has a top portion 64a which is curved as a circular arc. The curved portion protrudes upward from the upper surface 73a of the positioning member 73.

In the illustrated state with the cover 76 opened, the bent portion 64 is exposed through the opening 74.

Figure 37:
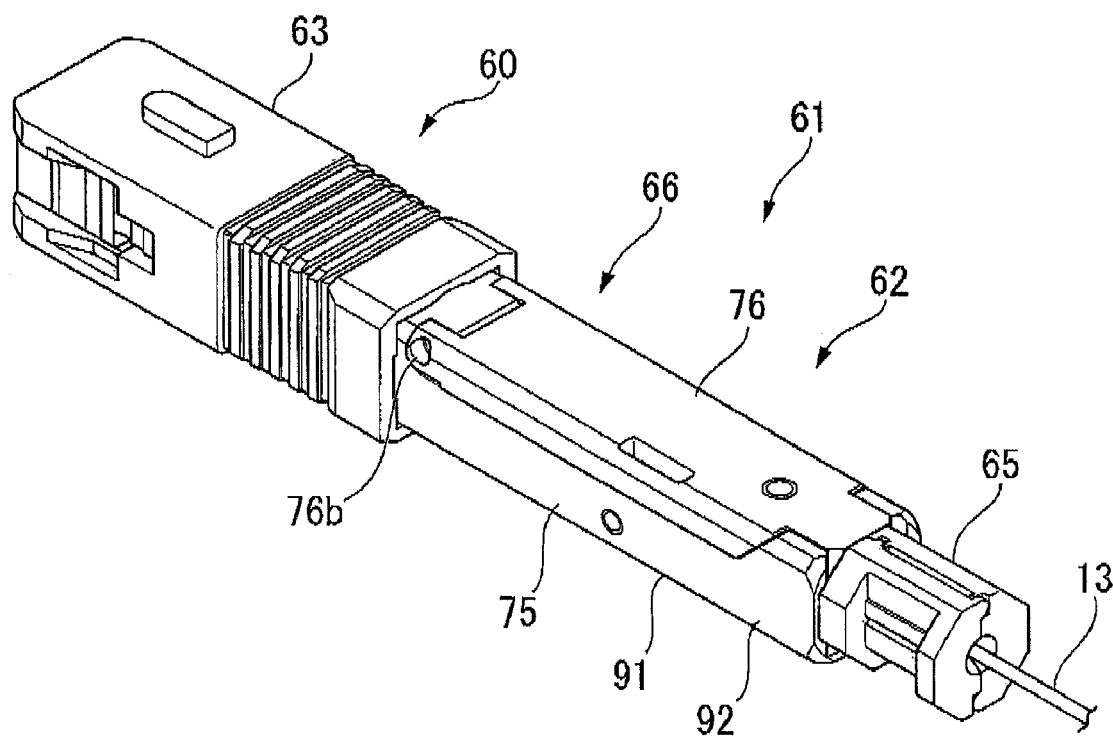
FIG. 37 is a perspective view of the optical connector.

As shown in FIG. 37, the cover 76 is rotated about the hinge 76b to close the opening 74.

As shown in FIG. 30, when the cover 76 is closed, the pressing member 72 abuts and presses against the top portion 64a of the bent portion 64 and the near side surfaces thereof. Since the bent portion 64 is partly disposed within the guide groove 83 and the posture and position thereof are kept unchanged, sufficient pressing force is applied to the bent portion 64.

When pressed by the pressing member 72, the bent portion 64 receives the force to reduce the amount of bending, and thus increase the forward-urging force of the bent portion 64. In this manner, the tip 13a of the optical fiber 13 is made to abut against the pre-assembled optical fiber 6 with sufficient force.

The abutting force keeps the splicing of the optical fiber 13 with the pre-assembled optical fiber 6 stable. Thus, even when the optical fiber 13 is used in hot environments for a long time, occurrence of connection loss can be prevented.

In the optical connector 61 in which the cover 76 closes the opening 74 and thus the pressing member 72 presses the bent portion 64, sufficient pressing force can be applied to the bent portion 64 with easy operation.

Although the plate-shaped elastically deformable pressing member 72 is used in the illustrated example, any structures may be used as long as it presses the bent portion in the invention. For example, the pressing member may be a projection, which is formed in the inside of the cover for pressing the bent portion.

Figure 38:
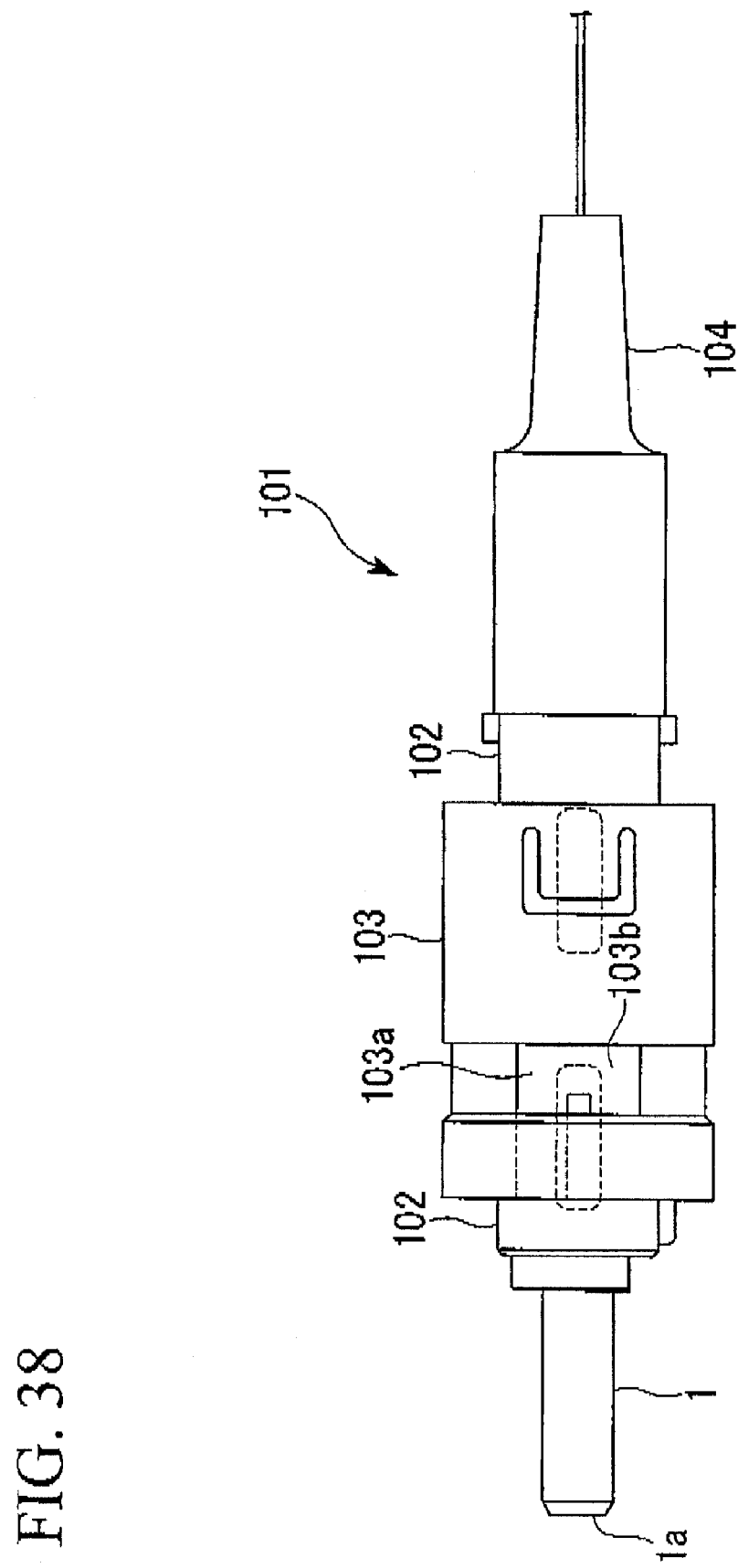
FIG. 38 is a structural side view of an optical connector employable in the invention.

FIG. 38 is a side view of an optical connector 101 which may also be used in the invention.

The optical connector 101 includes a ferrule with a connecting mechanism (not shown) with a ferrule 1, a housing 102 for accommodating the ferrule with a connecting mechanism, and a coupling 103 provided at the outside of the housing 102. Reference numeral 104 denotes a boot.

The optical connector 101 is a so-called ST optical connector (e.g., provided in IEC 874-10). The coupling 103 includes an insertion groove 103a and an engaging groove 103b altogether forming a mechanism for removably anchoring the coupling 103 to the optical connector adapter (not shown).

The insertion groove 103a and the engaging groove 103b regulate drawing-out of the optical connector 101 from the optical connector adapter when the coupling 103 is rotated to engage an engaging projection of the optical connector adapter to the engaging groove 103b. When the coupling 103 is rotated in the opposite direction to disengage the engaging projection, the optical connector 101 can be drawn out from the optical connector adapter.

While preferred embodiments of the invention have been described, the invention is not limited thereto. It is to be understood that structural addition, omission, change, and modifications may be made without departing from the scope of the invention. The invention is not limited by the description above but limited only by the appended claims.

What is claimed is:

1. An optical connector for splicing a rear end of a pre-assembled optical fiber that has been previously mounted within an optical ferrule in a connector body with a tip of a second optical fiber that is to be inserted into the connector body, the optical connector comprising:

the connector body; and an anchor mechanism for anchoring the second optical fiber to the connector body, wherein:

the connector body includes the optical ferrule and a connecting mechanism provided at a rear end side, opposite to a connecting end surface of the optical ferrule;

the connecting mechanism includes an optical fiber alignment hole in which the pre-assembled optical fiber extending from the rear end side of the optical ferrule is inserted, the rear end of the pre-assembled optical fiber and a front end of the second optical fiber being aligned and spliced with each other in the optical fiber alignment hole;

the anchor mechanism includes a holder for holding the second optical fiber, and a connecting portion which anchors the holder to the connector body;

at a position where the holder is anchored to the connector body and the rear end of the pre-assembled optical fiber and the second optical fiber are aligned and spliced with each other, the length of the second optical fiber from the holder to the tip is longer than the distance from the holder to the rear end of the pre-assembled optical fiber; and the rear end of the pre-assembled optical fiber has a curved convex end surface or an end with a diameter-reducing portion, and is PC-connectable to the tip of the second optical fiber.

2. The optical connector according to claim 1, wherein:

the connecting mechanism includes an outer cylinder body in which the rear end of the optical ferrule is inserted, an inner cylinder body of which rear end protrudes from the outer cylinder body, and an introducing cylinder body formed to continue from the rear end of the inner cylinder body;

the inner cylinder body includes the optical fiber alignment hole;

the introducing cylinder body includes a body portion provided at a rear end side of the inner cylinder body, and a connecting cylinder portion in which the rear end of the inner cylinder body is inserted; and the body portion includes a guide hole which guides the second optical fiber to the optical fiber alignment hole and accommodates a coated portion of the second optical fiber, and the guide hole communicates with the optical fiber alignment hole.

3. The optical connector according to claim 1, wherein:

the connecting mechanism includes an inner cylinder body and an introducing cylinder body;

the inner cylinder body includes the optical fiber alignment hole, the introducing cylinder body includes a body portion provided at a rear end of the inner cylinder body, and an outer cylinder body which accommodates the full length of the inner cylinder body, and in which the rear end of the optical ferrule is inserted; and the body portion includes a guide hole which guides the second optical fiber to the optical fiber alignment hole and accommodates a coated portion of the second optical fiber, and the guide hole communicates with the optical fiber alignment hole.

4. The optical connector according to claim 1, wherein:

the connecting mechanism includes an outer cylinder body in which the rear end of the optical ferrule is inserted, a first inner cylinder body, and a second inner cylinder body inserted into a rear end side of the first inner cylinder body within the outer cylinder body;

the first inner cylinder body includes the optical fiber alignment hole;

the second inner cylinder body includes a guide hole which guides the second optical fiber to the optical fiber alignment hole and accommodates a coated portion of the second optical fiber, and the guide hole communicates with the optical fiber alignment hole.

5. The optical connector according to claim 1, wherein:

a tip surface of the second optical fiber is cleaved to be a substantially flat surface, an angle of inclination of the tip surface of the optical fiber with respect to a plane perpendicular to an optical axis is equal to or smaller than 0.9 degrees, and abutting force of the tip surface against the pre-assembled optical fiber is equal to or smaller than 0.2 N; and an end surface of the rear end of the pre-assembled optical fiber is formed as a spherical surface, and the curvature radius thereof is 0.05 to 0.46 mm.

6. The optical connector according to claim 1, wherein:

the connecting portion includes: a second connector body which is able to anchor the second optical fiber to the connector body with a bent portion of the second optical fiber that is bent and urged toward the pre-assembled optical fiber and which includes an opening through which the bent portion of the second optical fiber is exposed; a cover for opening and closing the opening; and a pressing member for pressing the bent portion to enhance the urging force; and the pressing member is able to press the bent portion by the cover, closing the opening.

7. The optical connector according to claim 6, wherein the pressing member is formed as an elastically deformable plate so as to press the bent portion with elastic repulsive force.

8. An optical connector for splicing a rear end of a pre-assembled optical fiber that has been previously mounted within an optical ferrule in a connector body with a tip of a second optical fiber, the optical connector comprising:

the connector body having the optical ferrule; and an anchor mechanism for anchoring the second optical fiber to the connector body, wherein:

the anchor mechanism includes a holder for holding the second optical fiber, and a connecting portion which anchors the holder to the connector body;

the connecting portion is able to anchor the second optical fiber to the connector body in a state in which the second optical fiber is bent and urged toward the pre-assembled optical fiber;

at a position where the holder is anchored to the connector body and the rear end of the pre-assembled optical fiber and the second optical fiber are aligned and spliced with each other, the length of the second optical fiber from the holder to the tip is longer than the distance from the holder to the rear end of the pre-assembled optical fiber; and the rear end of the pre-assembled optical fiber has a curved convex end surface or an end with a diameter-reducing portion, and is PC-connectable to the tip of the second optical fiber.

9. The optical connector according to claim 8, wherein:

a tip surface of the second optical fiber is cleaved so as to be a substantially flat surface, an angle of inclination of the tip surface of the optical fiber with respect to a plane perpendicular to an optical axis is equal to or smaller than 0.9 degrees, and abutting force of the tip surface against the pre-assembled optical fiber is equal to or smaller than 0.2 N; and an end surface of the rear end of the pre-assembled optical fiber is formed as a spherical surface, and the curvature radius thereof is 0.05 to 0.46 mm.

10. An optical connector for splicing a rear end of a pre-assembled optical fiber that has been previously mounted within an optical ferrule in a connector body with a tip of a second optical fiber that is to be inserted into the connector body, the optical connector comprising:

the connector body; and an anchor mechanism for anchoring the second optical fiber to the connector body, wherein:

the connector body includes the optical ferrule and a connecting mechanism provided at a rear end side, opposite to a connecting end surface of the optical ferrule;

the connecting mechanism includes an optical fiber alignment hole in which the pre-assembled optical fiber extending from the rear end side of the optical ferrule is inserted, the rear end of the pre-assembled optical fiber and a front end of the second optical fiber being aligned and spliced with each other in the optical fiber alignment hole;

the anchor mechanism includes a holder for holding the second optical fiber, and a connecting portion which anchors the holder to the connector body;

at a position where the holder is anchored to the connector body and the rear end of the pre-assembled optical fiber and the second optical fiber are aligned and spliced with each other, the length of the second optical fiber from the holder to the tip is longer than the distance from the holder to the rear end of the pre-assembled optical fiber;

thus, the connecting portion is able to anchor the second optical fiber to the connector body in a state in which the second optical fiber is bent and urged toward the pre-assembled optical fiber;

the rear end of the pre-assembled optical fiber has a curved convex end surface or an end with a diameter-reducing portion, and is PC-connectable to the tip of the second optical fiber;

a tip surface of the second optical fiber is cleaved to be a substantially flat surface, an angle of inclination of the tip surface of the optical fiber with respect to a plane perpendicular to an optical axis is equal to or smaller than 0.9 degrees, and abutting force of the tip surface against the pre-assembled optical fiber is equal to or smaller than 0.2 N; and an end surface of the rear end of the pre-assembled optical fiber is formed as a spherical surface, and the curvature radius thereof is 0.05 to 0.46 mm.

11. The optical connector according to claim 10, wherein:

the connecting mechanism includes an outer cylinder body in which the rear end of the optical ferrule is inserted, an inner cylinder body of which rear end protrudes from the outer cylinder body, and an introducing cylinder body formed to continue from the rear end of the inner cylinder body;

the inner cylinder body includes the optical fiber alignment hole;

the introducing cylinder body includes a body portion provided at a rear end side of the inner cylinder body, and a connecting cylinder portion in which the rear end of the inner cylinder body is inserted; and the body portion includes a guide hole which guides the second optical fiber to the optical fiber alignment hole and accommodates a coated portion of the second optical fiber.

12. The optical connector according to claim 10, wherein:

the connecting mechanism includes an inner cylinder body and an introducing cylinder body;

the inner cylinder body includes the optical fiber alignment hole, the introducing cylinder body includes a body portion provided at a rear end of the inner cylinder body, and an outer cylinder body which accommodates the full length of the inner cylinder body, and in which the rear end of the optical ferrule is inserted; and the body portion includes a guide hole which guides the second optical fiber to the optical fiber alignment hole and accommodates a coated portion of the second optical fiber.

13. The optical connector according to claim 10, wherein:

the connecting mechanism includes an outer cylinder body in which the rear end of the optical ferrule is inserted, a first inner cylinder body, and a second inner cylinder body inserted into a rear end side of the first inner cylinder body within the outer cylinder body;

the first inner cylinder body includes the optical fiber alignment hole;

the second inner cylinder body includes a guide hole which guides the second optical fiber to the optical fiber alignment hole and accommodates a coated portion of the second optical fiber.

14. An optical connector for splicing a rear end of a pre-assembled optical fiber that has been previously mounted within an optical ferrule in a connector body with a tip of a second optical fiber that is to be inserted into the connector body, the optical connector comprising:

the connector body; and an anchor mechanism for anchoring the second optical fiber to the connector body, wherein:

the connector body includes the optical ferrule and a connecting mechanism provided at a rear end side, opposite to a connecting end surface of the optical ferrule;

the connecting mechanism includes an optical fiber alignment hole in which the pre-assembled optical fiber extending from the rear end side of the optical ferrule is inserted, the rear end of the pre-assembled optical fiber and a front end of the second optical fiber being aligned and spliced with each other in the optical fiber alignment hole;

the anchor mechanism includes a holder for holding the second optical fiber, and a connecting portion which anchors the holder to the connector body;

the rear end of the pre-assembled optical fiber has a curved convex end surface or an end with a diameter-reducing portion;

at a position where the holder is anchored to the connector body and the rear end of the pre-assembled optical fiber and the second optical fiber are aligned and spliced with each other, the second optical fiber is bent at a position where it protrudes from the holder, and the bending generates pressing force in the second optical fiber toward the rear end of the pre-assembled optical fiber, and the tip of the optical fiber and the rear end of the pre-assembled optical fiber are PC-connected.

15. The optical connector according to claim 14, wherein:

the connecting mechanism includes an outer cylinder body in which the rear end of the optical ferrule is inserted, an inner cylinder body of which rear end protrudes from the outer cylinder body, and an introducing cylinder body formed to continue from the rear end of the inner cylinder body;

the inner cylinder body includes the optical fiber alignment hole;

the introducing cylinder body includes a body portion provided at a rear end side of the inner cylinder body, and a connecting cylinder portion in which the rear end of the inner cylinder body is inserted; and the body portion includes a guide hole which guides the second optical fiber to the optical fiber alignment hole and accommodates a coated portion of the second optical fiber.

16. The optical connector according to claim 14, wherein:

the connecting mechanism includes an inner cylinder body and an introducing cylinder body;

the inner cylinder body includes the optical fiber alignment hole, the introducing cylinder body includes a body portion provided at a rear end of the inner cylinder body, and an outer cylinder body which accommodates the full length of the inner cylinder body, and in which the rear end of the optical ferrule is inserted; and the body portion includes a guide hole which guides the second optical fiber to the optical fiber alignment hole and accommodates a coated portion of the second optical fiber.

17. The optical connector according to claim 14, wherein the connecting mechanism includes an outer cylinder body in which the rear end of the optical ferrule is inserted, a first inner cylinder body, and a second inner cylinder body inserted into a rear end side of the first inner cylinder body within the outer cylinder body;

wherein the first inner cylinder body includes the optical fiber alignment hole; and wherein the second inner cylinder body includes a guide hole which guides the second optical fiber to the optical fiber alignment hole and accommodates a coated portion of the second optical fiber.

18. The optical connector according to claim 14, wherein:

a tip surface of the second optical fiber is cleaved to be a substantially flat surface, an angle of inclination of the tip surface of the optical fiber with respect to a plane perpendicular to an optical axis is equal to or smaller than 0.9 degrees, and abutting force of the tip surface against the pre-assembled optical fiber is equal to or smaller than 0.2 N; and an end surface of the rear end of the pre-assembled optical fiber is formed as a spherical surface, and the curvature radius thereof is 0.05 to 0.46 mm.

19. The optical connector according to claim 14, wherein the connecting portion includes:

a second connector body which is able to anchor the second optical fiber to the connector body with a bent portion of the second optical fiber that is bent and urged toward the pre-assembled optical fiber and which includes an opening through which the bent portion of the second optical fiber is exposed;

a cover for opening and closing the opening; and a pressing member for pressing the bent portion to enhance the urging force; and wherein the pressing member is able to press the bent portion by the cover, closing the opening.

* * * * *